(12) United States Patent
Kamiya et al.

(10) Patent No.: US 6,303,034 B1
(45) Date of Patent: *Oct. 16, 2001

(54) WASTE WATER OZONIZATION PROCESS AND APPARATUS

(75) Inventors: Toshiyuki Kamiya; Junji Hirotsuji; Satoru Shiono; Seiji Furukawa, all of Tokyo (JP)

(73) Assignee: The Japanese Research & Development Association for Environment Friendly Processing in Food Industry, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/084,951

(22) Filed: May 28, 1998

(30) Foreign Application Priority Data

May 30, 1997 (JP) .................................................. 9-142422
May 14, 1998 (JP) ................................................ 10-132242

(51) Int. Cl.$^7$ ...................................................... C02F 1/78
(52) U.S. Cl. .......................... 210/603; 210/607; 210/614; 210/622; 210/627; 210/746; 210/739; 210/760; 210/143; 210/220
(58) Field of Search .................................. 210/760, 614, 210/603, 607, 622, 627, 739, 746, 143, 221.2, 220

(56) References Cited

U.S. PATENT DOCUMENTS

| 3,505,213 | * | 4/1970 | Anthony et al. . | |
| 3,607,735 | * | 9/1971 | Hover | 210/220 |
| 4,200,524 | * | 4/1980 | Levin | 210/5 |
| 4,250,040 | * | 2/1981 | LaRaus | 210/760 |
| 4,453,953 | * | 6/1984 | Tanaka et al. | 55/163 |

(List continued on next page.)

FOREIGN PATENT DOCUMENTS 08052488  2/1996 (JP) .
9-150185 * 6/1997 (JP) .

OTHER PUBLICATIONS www.japan.co.jp/~sogapat downloaded on Apr. 28, 2000.*
Sakai et al. "An Activated Sludge Process Without Excess Sludge Production", Wat. Sci. Tech., vol. 36, No. 11, pp. 163–170, 1997.
Yasui et al. "An Innovative Approach to Reduce Excess Sludge Production in the Activated Sludge Process", Wat. Sci. Tech., vol. 30, No. 9, pp. 11–20, 1994.
Yasui et al., "A Full–Scale Operation of a Novel Activated Sludge Process Without Excess Sludge Production", Wat. Sci. Tech., vol. 34, No. 3–4, pp. 395–404, 1996.

*Primary Examiner*—Chester T. Barry
(74) *Attorney, Agent, or Firm*—Leydig, Voit & Mayer, Ltd.

(57) ABSTRACT

During a waste water treatment process such as an activated-sludge process using microorganisms, the present invention ozonizes a microorganism-mixed liquid. It reduces the amount of microorganisms remaining, prevents a microorganism floc from sedimenting inappropriately, and recovers appropriate sedimentation while maintaining treatment performance. A waste water ozonization apparatus according to an embodiment of the present invention can include a sludge drawing pump which draws a microorganism-mixed liquid from an aeration vessel; an ozonizer for generating ozone gas which reacts with the microorganism-mixed liquid; an ozonization vessel which injects the ozone gas generated by the ozonizer into the drawn microorganism-mixed liquid; an ozonized-sludge channel that returns the ozonized microorganism-mixed liquid to the aeration vessel; and a control section for intermittently performing an ozonization operation.

21 Claims, 14 Drawing Sheets

U.S. PATENT DOCUMENTS

| | | | |
|---|---|---|---|
| 4,462,965 | * | 7/1984 | Azuma et al. .................. 422/186.08 |
| 5,139,625 | | 8/1992 | Tanaka et al. ....................... 204/130 |
| 5,324,666 | * | 6/1994 | Siepmann et al. ................... 210/746 |
| 5,498,347 | * | 3/1996 | Richard ................................ 210/739 |
| 5,527,465 | * | 6/1996 | Dickerson . |
| 5,573,670 | * | 11/1996 | Nagasaki et al. .................... 210/614 |
| 5,858,222 | * | 1/1999 | Shibata et al. ....................... 210/177 |
| 5,888,271 | * | 3/1999 | Tanimura ................................ 95/12 |
| 5,989,439 | * | 11/1999 | Persinger ............................. 210/748 |
| 6,113,788 | * | 9/2000 | Molof et al. . |

* cited by examiner

CHANGE OF SOLID CONCENTRATION AFTER OZONE TREATMENT
● TOTAL VOLATILE SOLIDS    ○ SOLUBILIZED TOC

WASTE WATER OZONIZATION PROCESS AND APPARATUS

BACKGROUND OF THE INVENTION

1. Field of the Invention

The present invention relates to a waste water treatment process and apparatus, and in particular, to a waste water treatment process and apparatus that ozonizes a microorganism-mixed liquid during a waste water treatment process such as an activated-sludge process using microorganisms in order to reduce the amount of microorganisms occurring, to prevent a microorganism aggregate, that is, a microorganism floc from sedimenting inappropriately, and to recover the inappropriate sedimentation while maintaining the quality of treated water.

2. Description of Related Art

Those treatment processes such as activated-sludge processes which use microorganisms and which are conventionally and commonly used to treat waste water may cause a large amount of sludge to remain due to the waste water treatment. The excess sludge is mostly disposed of by incineration after dehydration and is sometimes digested by microorganisms. The disposal of the excess sludge, however, requires a large amount of energy and costs. Thus, it is necessary to minimize the sludge generated after waste water treatment.

In addition, during waste water treatment, the multiplication of filamentous bacteria may prevent the sludge from sedimenting appropriately, often making solid-liquid separation in a precipitator insufficient. In this case, microorganisms may flow out with the treated water to degrade its quality. Thus, to provide stable waste water treatment, the inappropriate sedimentation of the sludge must be prevented and the appropriate sedimentation of the sludge must be recovered.

As a process for reducing the sludge generated after waste water treatment, for example, a process for drawing activated sludge from a treatment system and introducing the sludge into the treatment system after ozonization is proposed in Japanese Patent Laid-Open No. 6-206088. FIG. 26 shows an example of treatment flow for a conventional waste water ozonization process. As shown in the figure, an incoming water channel 2 is connected to an inlet side of an aeration vessel 1, and an interconnecting channel 3 is connected to an outlet side of the vessel 1. In addition, a drawn-sludge channel 6 including a sludge-drawing pump 5 in its middle is introduced into an ozonization vessel 4 from the aeration vessel 1. The ozonization vessel 4 connects to an ozone supply channel 8 that supplies ozone; an ozone discharge channel 7 that discharges ozone that has not been used for reaction with sludge; and an ozonized sludge channel 9 that returns ozonized sludge to the aeration vessel 1. A diffuser is provided on the bottom of the aeration vessel 1 and an air supply channel is connected to the diffuser. The interconnecting channel 3 is further connected to a sludge separation section to which treated-liquid channel and a sludge-drawn channel are connected, and a returned-sludge channel including a sludge-returning pump connects a sludge draw-out channel and the aeration vessel 1 together. The description of these components, however, are omitted.

Next, a conventional treatment process is described. Organic waste water is introduced into the aeration vessel 1 through the incoming water channel 2, and air is then diffused in the aeration vessel 1 to activate sludge for aerobic treatment. Then, the mixed-liquid in the aeration vessel 1 is delivered to the sludge separation section through the interconnecting channel 3 for solid-liquid separation, and the separated-liquid is discharged as treated water. Sludge drawn by the sludge-drawing pump 5 from the aeration vessel 1 through the drawn-sludge channel 6 is circulated to the ozonization vessel 4 where the sludge is contacted with ozone provided through the ozone supply channel 8 and subjected to ozonization. The ozonized sludge is returned to the aeration vessel 1 through the ozonized-sludge channel 9 for aerobic treatment.

In this process, activated sludge the amount of which is larger than the amount of sludge multiplied by the assimilation of BOD in the treated-liquid is drawn from an aerobic treatment system, ozonized, and introduced into the aerobic treatment system to reduce the occurrence of excess sludge.

For example, Yasui, et al. reported on the ozonization of activated ozone drawn from the treatment system (Wat. Sci. Tech., 30, 11 (1994)). FIG. 27 is a characteristic diagram showing the relationship between ozone dose and the concentrations of MLVSS and soluble TOC in a case in which 30 mg/L of ozone is used for drawn activated sludge to execute batch ozonization.

This figure indicates that the ozonization of activated sludge does not substantially change the concentration of MLVSS and slightly increases the concentration of soluble TOC. Under these ozonization conditions, only part of the activated sludge is solubilized and little activated sludge is made inorganic.

During ozonization, the conventional techniques continuously inject ozone into the activated sludge drawn from the aeration vessel, so a large ozone dose must be injected to reduce the amount of excess sludge, thereby increasing ozone manufacturing costs.

In addition, under the ozonization conditions in FIG. 27, the ozonization solubilizes only part of the sludge and does not make it inorganic, resulting in few changes in the amount of organic substance. Thus, when such ozonization is carried out during the conventional treatment process that ozonizes the drawn activated-sludge before returning it to the aeration vessel, all organic substance corresponding to the drawn sludge act as loads on the aeration vessel to increase the load, thereby increasing the concentration of organic substance in treated water to degrade its quality. The amount of aeration required to maintain the quality of treated water is also increased.

In addition, since the only effect of the introduction of the ozonization of the activated sludge according to the conventional techniques is the reduction of the amount of excess sludge, these techniques cannot prevent the inappropriate sedimentation of activated sludge that significantly hinders the solid-liquid separation of the sludge or recover appropriate sedimentation.

In addition, the conventional techniques executes ozonization regardless of the organic substances decomposition activity of the activated sludge. Consequently, if an external factor such as a qualitative change in incoming waste water or a change in temperature, or the introduced ozone reduces the organic substances decomposition activity of the activated sludge, the ozonization further significantly reduces the organic substances decomposition activity of the activated sludge to increase the concentration of organic substances in treated water, that is, to degrade the quality of the treated water.

In addition, the conventional techniques carry out ozonization regardless of the variation of incoming organic loads. Consequently, if the concentration of organic substances in the incoming waste water or the amount of water discharged increases to increase the organic loads, the ozonization further significantly increases the organic loads on the aeration vessel to increase the concentration of organic substances in the treated water, thereby degrading the quality of the treated water. It also increases the amount of aeration required to maintain the quality of the treated water.

In addition, the conventional techniques execute ozonization and air supply to the aeration vessel regardless of the concentration of dissolved oxygen in the activated-sludge-mixed liquid in the aeration vessel. Thus, if the organic loads increase, to reduce the amount of dissolved oxygen in the activated-sludge-mixed liquid, the ozonization further reduces the amount of dissolved oxygen to increase the concentration of organic substances in the treated water, thereby degrading the quality of the treated water. In addition, if the organic substances decomposition activity of the activated sludge decreases to increase the amount of dissolved oxygen in the activated-sludge-mixed liquid, the ozonization further reduces the organic substances decomposition activity of the activated sludge to increase the concentration of organic substances in the treated water, thereby degrading the quality of the treated water.

In addition, the conventional techniques carry out the ozonization regardless of the amount and composition of extracellular organic substances in an activated sludge floc that is a microorganism aggregate in the activated sludge. Consequently, if a large amount of extracellular organic substances are contained in the activated sludge floc, most of the injected ozone reacts with the extracellular organic substances in the activated sludge floc and the injected ozone is not effectively used for reaction with activated-sludge microorganisms, thereby preventing the amount of excess sludge resulting from the ozonization from being stably reduced.

In addition, the conventional techniques carry out the ozonization regardless of the resistivity of the activated-sludge microorganisms to ozone. As a result, if anti-oxidization enzymes in the activated-sludge microorganisms that protect the microorganisms are very active and the activated-sludge microorganisms have a high resistance to oxidization, the injected ozone cannot kill the microorganisms and is not effectively used to make the activated-sludge microorganisms inorganic or for reaction for solubilization, thereby preventing the amount of excess sludge resulting from the ozonization from being stably reduced.

In addition, according to the conventional techniques, the effects of the introduction of the ozonization of the activated sludge can be provided only for an aeration vessel consisting of a single vessel but not for an aeration vessel consisting of multiple vessels.

In addition, the conventional techniques do not adjust the amount of ozonized sludge in returning the sludge to the aeration vessel. Thus, if the organic loads temporarily increase due to an increase in the concentration of organic substances in the incoming waste waster or in the amount of water discharged, the ozonization further significantly increases the organism loads relative to the activated sludge in the aeration vessel to increase the concentration of organisms in the treated water, thereby degrading the quality of the treated water. It also increases the amount of aeration required to maintain the quality of the treated water.

In addition, in the ozonization of the activated sludge, the conventional techniques have a low ozone solution efficiency, a low efficiency in the contact between the activated sludge and ozone, and a low reaction efficiency due to their simple injection of ozone into the activated sludge.

In addition, since the conventional techniques use only ozone to treat the drawn activated-sludge without the use of other strong oxidizing agents, the activated-sludge microorganisms are killed but are unlikely to become soluble or inorganic. Consequently, such ozonization causes all organic substances corresponding to the drawn sludge to act as loads on the aeration vessel to increase the load and thus the concentration of organic substances in the treated water, thereby degrading the quality of the treated water. It also increases the amount of aeration required to maintain the quality of the treated water.

SUMMARY OF THE INVENTION

In waste water microorganism treatment, a waste water ozonization process according to the invention comprises the steps of drawing part of a microorganism-mixed liquid from a treatment system, injecting ozone into the drawn mixed-liquid for ozonization, and returning the ozonized mixed liquid to the treatment system.

In a waste water ozonization process according to the invention, intermittent ozonization is executed.

In a waste water ozonization process according to the invention, an ozone gas of concentration 50 mg/L or more in ozone concentration is used.

In a waste water ozonization process according to the invention, the reaction time during the ozonization is several seconds to 10 minutes.

In a waste water ozonization process according to the invention, the ozonization conditions are changed depending on how a microorganism aggregate sediments in the microorganism-mixed liquid.

In a waste water microorganism treatment, a waste water ozonization apparatus according to the invention comprises a mixed-liquid drawing means for drawing a microorganism-mixed liquid from a treatment system; an ozone generation means for generating an ozone gas to be reacted with the microorganism-mixed liquid; an ozonization means for injecting into the drawn microorganism-mixed liquid the ozone gas generated by the ozone generation means to treat the mixed liquid; a mixed-liquid returning means for returning the ozonized microorganism-mixed liquid to the treatment system; and a control means for controlling the ozonization operation.

In a waste water ozonization apparatus according to the invention, the control means comprises a control means for executing the intermittent ozonization.

A waste water ozonization apparatus according to the invention includes a measuring means for executing measurements to determine how a microorganism aggregate in the microorganism-mixed liquid sediments, and the control means executes the ozonization depending on a measured value obtained by the measuring means.

A waste water ozonization apparatus according to the invention includes a measuring means for measuring the organic substances decomposition activity of the microorganism aggregate in the microorganism-mixed liquid, and the control means executes the ozonization depending on a measured value obtained by the measuring means.

A waste water ozonization apparatus according to the invention includes a measuring means for measuring an organic load that flows into the treatment system, and the control means executes the ozonization depending on a measured value obtained by the measuring means.

A waste water ozonization apparatus according to the invention includes a measuring means for measuring the dissolved oxygen in the microorganism-mixed liquid, and the control means executes the ozonization depending on a measured value obtained by the measuring means while adjusting the amount of air supplied to a microorganism reaction vessel in the treatment system.

A waste water ozonization apparatus according to the invention includes a measuring means for executing measurements relating to extracellular organic substances in the microorganism aggregate in the microorganism-mixed liquid, and the control means executes the ozonization depending on a measured value obtained by the measuring means.

A waste water ozonization apparatus according to the invention includes a measuring means for measuring the anti-oxidization enzyme activity of the microorganism aggregate in the microorganism-mixed liquid, and the control means executes the ozonization depending on a measured value obtained by the measuring means.

In a waste water ozonization apparatus according to the invention, the mixed-liquid drawing means is connected to one of a large number of vessels constituting the microorganism reaction vessel in the treatment system, and the mixed-liquid returning means is connected to one of the large number of vessels constituting the microorganism reaction vessel in the treatment system that is different from the one to which the mixed-liquid drawing means is connected.

In a waste water ozonization apparatus according to the invention, the ozonization means includes a storage means for storing the microorganism-mixed liquid after ozonization.

In a waste water ozonization apparatus according to the invention, the ozonization means includes at least one of an injection means for injecting an ozone gas of a high pressure generated by the ozone generation means into the microorganism-mixed liquid drawn by the mixed-liquid drawing means and a mixing means for mixing the injected ozone with the microorganism-mixed liquid and guiding the mixture to the mixed-liquid returning means.

In a waste water ozonization apparatus according to the invention, the ozonization means includes an injection means for injecting hydrogen peroxide.

In a waste water ozonization apparatus according to the invention, the ozonization means includes a distributing means for distributing the microorganism aggregate in the microorganism-mixed liquid drawn by the mixed-liquid drawing means.

In a waste water ozonization apparatus according to the invention, the ozone generation means includes a storage means for generating an ozone gas and storing the generated ozone.

DETAILED DESCRIPTION OF THE PREFERRED EMBODIMENTS

Embodiment 1

Experiment 1 on which a waste water ozonization process according to embodiment 1 of this invention is based and the effects of this embodiment that are verified by experiment 1 are described.

Experiment 1

A continuous waste water treatment experiment was conducted at a retention time of 12 hours and a sludge retention time of 20 days using an 8 L aeration vessel and artificial waste water mainly consisting of meat extract and peptone and having a TOC concentration of about 200 mg/L. Two treatment systems were installed and one of them was used as an ozonization system. In this system, 600 ml of sludge was drawn from the aeration vessel, fed into a 1 L gas washing bottle, and returned to the aeration vessel after ozonization. The concentration of ozone was about 30 mg/L, and ozone dose was 0 to 50 mg-O3/g-MLSS. The other was used as a non-ozonization system wherein sludge was simultaneously drawn from the aeration vessel and then returned to the vessel after only oxygen was then applied to the sludge under the same conditions as in ozone.

This series of operations were intermittently performed six times a day. If the treated-sludge ratio is assumed to be the ratio of the amount of sludge ozonized to the amount of sludge estimated to multiply using organic substances in incoming waste water as a base, the treated-sludge ratio in this case is about 5. An experiment in which ozone was continuously injected was also conducted using the same ozone dose per day and the same amount of sludge ozonized per day as in the intermittent ozone injection.

Figure 1:
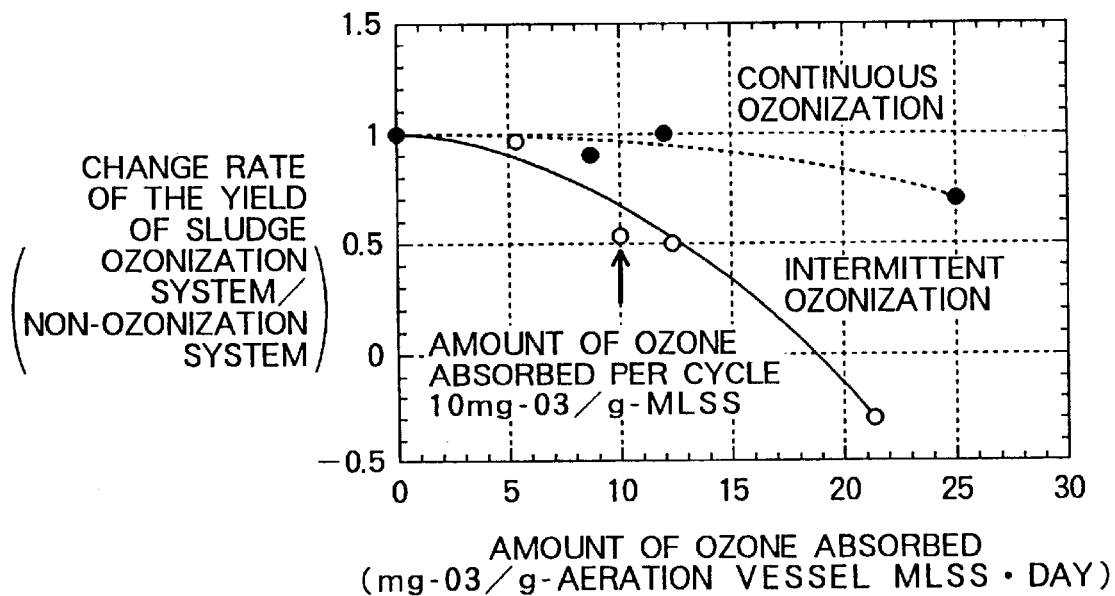
FIG. 1 is a characteristic diagram showing the relationship of the change rate in ozone dose and the yield of sludge in experiments concerning this invention.

FIG. 1 shows the relationship between ozone dose and the change rate of the yield of sludge, that is, the ratio of the yield of the ozone injection system to the yield of the non-ozonization system. This figure shows that the decrease in the yield of sludge in the intermittent ozonization is larger than the decrease in the yield of sludge in the continuous ozonization, thereby indicating that the intermittent ozonization is far more effective than the continuous ozonization in reducing the amount of sludge generated. FIG. 1 shows that compared to the continuous ozonization, the intermittent ozonization requires only one-third of ozone to be absorbed in the case of continuous ozonization to reduce the yield of sludge by, for example, 40%, requiring a very small ozone dose to significantly reduce the amount of sludge generated.

FIG. 1 shows that if ozone dose is 10 mg-O3/g-MLSS, the amount of sludge generated can be reduced by about 50%, indicating that the amount of ozone dose that is desired to reduce the amount of sludge generated is 10 mg-O3/g-MLSS or more.

Figure 2:
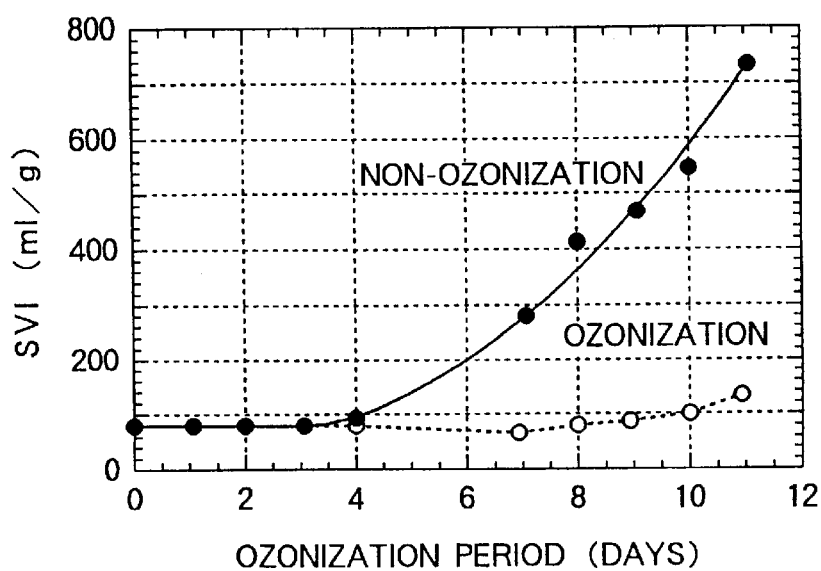
FIG. 2 is a characteristic diagram showing the relationship between the processing time and SVI in the experiments concerning this invention.

In experiment 1, when ozone dose was 10 mg-O3/g-MLSS in the intermittent ozonization, SVI changes during treatment as shown in FIG. 2. In the non-ozonization system, SVI started to increase in the middle of the experiments, that is, the sludge started to sediment inappropriately, whereas in the ozone injection system, SVI did not change and the sludge sedimented appropriately. It is thus evident that the intermittent ozonization can reduce the amount of sludge generated and prevent the sludge from sedimenting inappropriately.

Embodiment 2

Experiments 2 and 3 on which a waste water ozonization process according to embodiment 2 of this invention is based and the effects of this embodiment that are verified by experiments 2 and 3 are described.

Experiment 2

Figure 3:
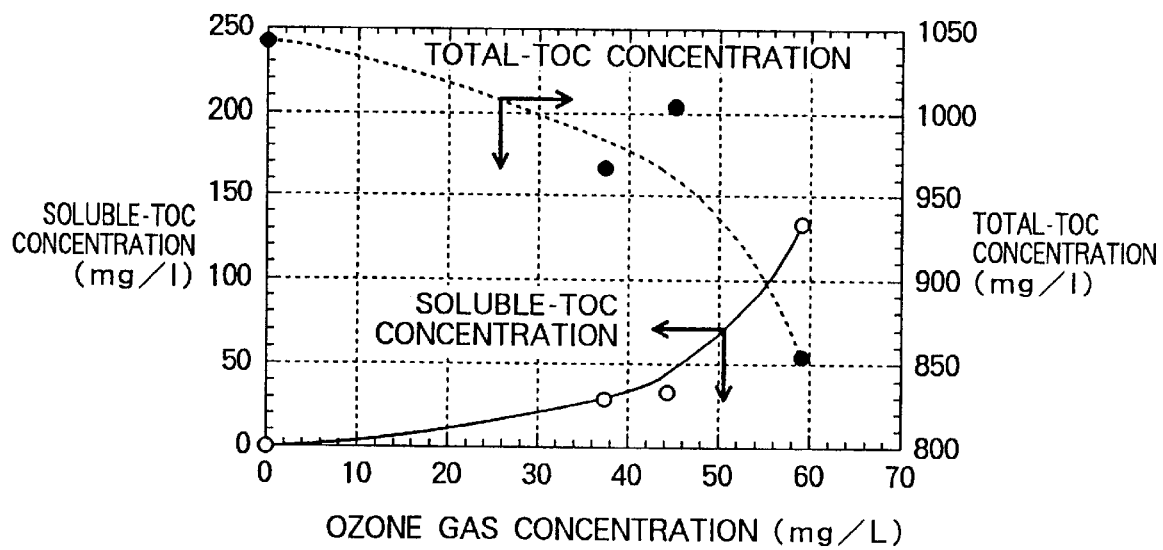
FIG. 3 is a characteristic diagram showing the relationship between the concentrations of ozone gas, total TOC, and dissolved TOC in the experiments concerning this invention.

Six hundred ml of activated sludge of 1700 mg/L MLSS concentration was fed into a 1 L gas washing bottle, and batch ozonization was carried out by varying the concentration of ozone (0 to 60 mg/L). FIG. 3 shows the relationship between the concentration of ozone gas and the concentrations of TOC and dissolved TOC in the sludge solution, and shows that as the concentration of the ozone gas increases, not only the concentration of dissolved TOC increases, that is, the solubilization of the sludge progresses but the concentration of total TOC also decreases, that is, the sludge becomes more and more inorganic. This trend was distinguished at an ozone concentration of 50 mg/L, and the sludge became even more inorganic when the concentration was higher.

Experiment 3

Figure 4:
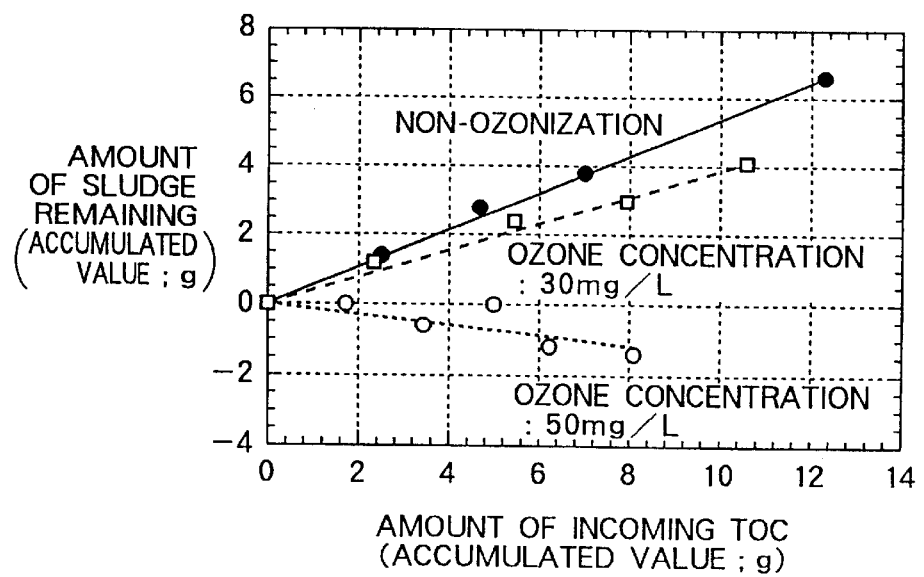
FIG. 4 is a characteristic diagram showing the relationship between the amount of incoming TOC and the amount of sludge generated in the experiments concerning this invention.

In an experiment similar to experiment 1, intermittent ozonization was carried out by using the same ozone dose and the same treated-sludge ratio and varying the concentration of ozone. FIG. 4 shows the relationship between the accumulated value of the amount of incoming TOC and the accumulated value of the amount of sludge generated, and shows that the slope in the figure corresponding to the yield of sludge is smaller at an ozone concentration of 50 mg/L than at an ozone concentration of 30 mg/L.

In addition, at an ozone concentration of 30 mg/L, the concentration of TOC in the treated water was higher in the ozonization system than in the non-ozonization system by 2 to 5 mg/L, whereas at an ozone concentration of 50 mg/L, the concentration of TOC in the treated water was about 20 mg/L in both ozonization and non-ozonization systems and no difference was observed between the ozonization and non-ozonization systems.

The results of experiments 2 and 3 clearly show that the intermittent injection into the sludge of an ozone gas of ozone concentration 50 mg/L causes the sludge to not only solubilized but also become inorganic and that the ozonization that makes the sludge inorganic enhances the effect of the reduction of the amount of sludge remaining and prevents the quality of the treated water from being degraded.

Although experiment 3 executed the intermittent ozonization, this embodiment is not limited to this aspect but the continuous ozonization can provide similar effects by using an ozone gas of ozone concentration 50 mg/L or more.

Embodiment 3

Experiments 4 and 5 on which a waste water ozonization process according to embodiment 3 of this invention is based and the effects of this embodiment that are verified by experiments 4 and 5 are described.

Experiment 4

Figure 5:
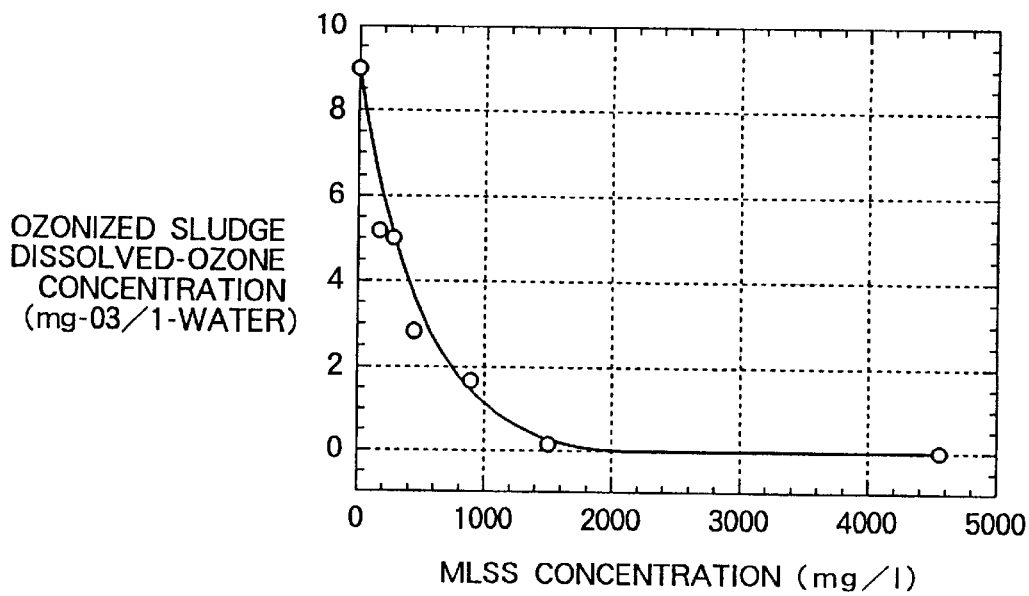
FIG. 5 is a characteristic diagram showing the relationship between the concentration of MLSS and the concentration of dissolved ozone in ozonized sludge in the experiments concerning this invention.

Six hundred ml of activated sludge of 70 to 4,600 mg/L MLSS concentration was fed into a 1 L gas washing bottle, and batch ozonization was carried out by injecting a gas of ozone concentration 50 mg/L at a flow rate of 800 mL/sec. for three minutes. Immediately after the injection of ozone was finished, potassium iodide was fed into the ozonized activated-sludge to absorb dissolved ozone remaining in the activated sludge in order to measure the concentration of the dissolved ozone. FIG. 5 shows the relationship between the concentration of MLSS in the activated sludge and the concentration of the dissolved ozone, and shows that the concentration of the dissolved ozone decreased with increasing concentration of MLSS. At an MLSS concentration of 1,500 mg/L, the concentration of the dissolved ozone become zero and the injected ozone was instantaneously consumed in reaction with the sludge instead of remaining in the solution as the dissolved ozone.

Experiment 5

A continuous waste water treatment experiment was conducted at a retention time of 12 hours and a sludge retention time of 20 days using an 8 L aeration vessel and artificial waste water mainly consisting of meat extract and peptone and having a TOC concentration of about 200 mg/L. Two treatment systems were installed and one of them was used as an ozonization system. In this system, sludge from the aeration vessel was circulated so as to return to the aeration vessel through a 1 L ozonization reaction vessel, and ozone was fed into the circulated sludge for a specified period of time for ozonization. The other was used as a non-ozonization system wherein sludge from the aeration vessel was similarly circulated and wherein only oxygen was applied to the sludge under the same conditions as in ozone. The concentration of ozone was about 110 mg/L, and this series of operations were intermittently performed three times a day. Intermittent ozone injection was executed by using the same ozone dose and the same treated-sludge ratio and varying the retention time of the sludge in an ozone reaction vessel (1 to 35 minutes).

Figure 6:
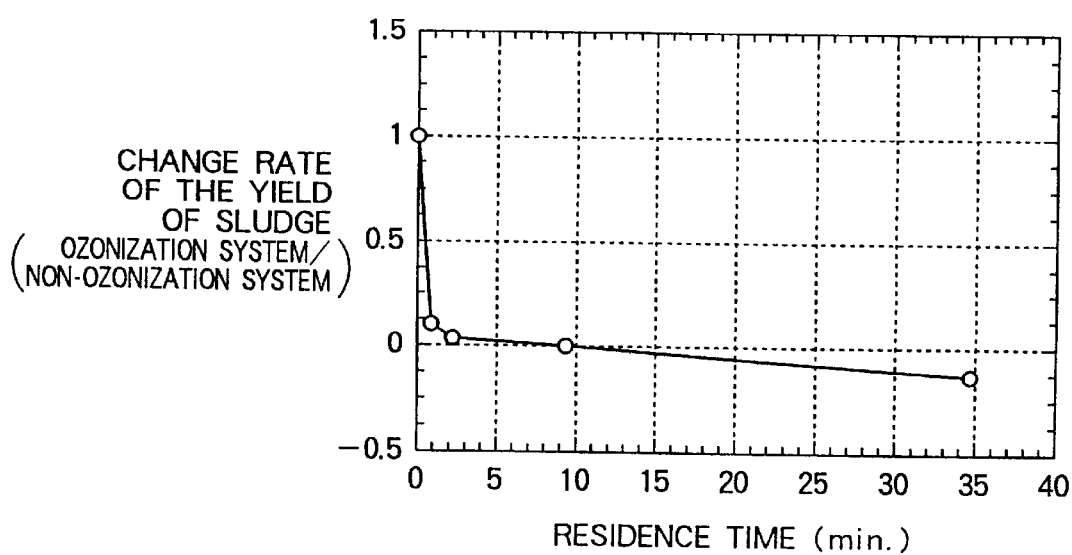
FIG. 6 is a characteristic diagram showing the relationship between the retention time and the change rate of the yield of sludge in the experiments concerning this invention.

FIG. 6 shows the relationship between the retention time of the sludge in the ozone reaction vessel and the change rate of the yield of sludge, and shows that the change rate of the yield of sludge was about 0.1, that is, little sludge generated after one minute of retention time. The yield of sludge became zero after 10 minutes or more of retention time.

The results of experiments 4 and 5 show that the reaction between the injected ozone and the activated sludge progresses at a very high speed, that a short reaction time is effective in reducing the amount of sludge generated, and that if the activated sludge being circulated is ozonized as in experiment 5, several seconds to ten minutes of retention time is sufficiently effective in reducing the amount of sludge generated.

Although the intermittent ozonization was executed in experiment 5, this embodiment is not limited to this aspect but several seconds to ten minutes of retention i.e., residence time is also sufficiently effective in reducing the amount of sludge generated if continuous ozonization is provided.

Since only several seconds to 10 minutes of retention time is required to reduce the amount of sludge generated, an ozone reaction section in which the activated sludge is reacted with ozone can be miniaturized. Thus, this is very effective in constructing an actual apparatus.

Embodiment 4

The effects of embodiment 4 of this invention that are verified by experiments 6 through 8 on which a waste water ozonization process according to this embodiment is based are described.

Experiment 6

Figure 7:
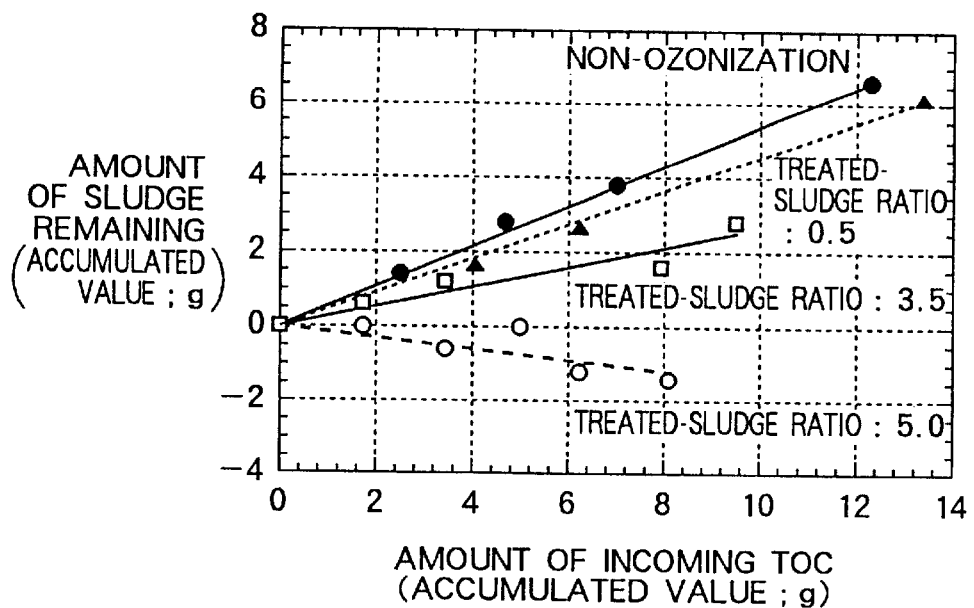
FIG. 7 is a characteristic diagram showing the relationship between the amount of incoming TOC and the amount of sludge generated in the experiments concerning this invention.

In an experiment similar to experiment 1, intermittent ozonization was carried out by varying the treated-sludge ratio (0.5 to 5.0). FIG. 7 shows the relationship between the accumulated value of the amount of incoming TOC and the accumulated value of the amount of sludge generated, and shows that the effect of the reduction of the amount of sludge increases with increasing treated-sludge ratio. In this experiment, there was not a large difference in the concentration of TOC in the treated water, between the ozonization system and the non-ozonization system. When, however, the treated-sludge ration was 10 or more, the amount of sludge generated decreased but the concentration of TOC in the treated water substantially increased to significantly degrade the quality of the treated water. In addition, in the ozonization system, the excessive occurrence of filamentous bacteria was not observed and the inappropriate sedimentation of the sludge was prevented. It is thus evident that the treated-sludge ratio must be 10 or less to reduce the amount of sludge generated and to prevent the sludge from sedimenting inappropriately and that the ratio is desirably between 0.5 and 5.

Experiment 7

Figure 8:
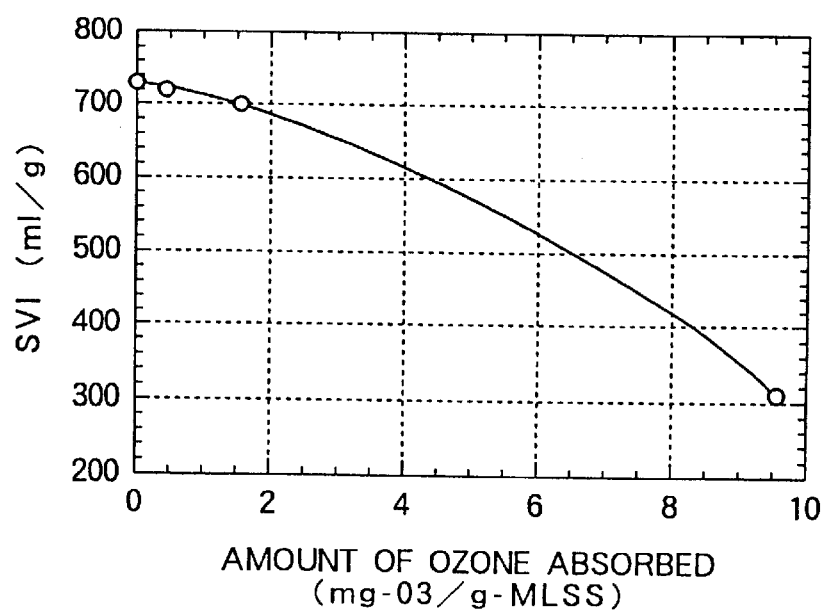
FIG. 8 is a characteristic diagram showing the relationship between ozone dose absorbed and SVI in the experiments concerning this invention.

Next, the effects of ozone on sludge that sedimented inappropriately due to the excessive occurrence of filamentous bacteria was examined. Six hundred ml of SVI, 730 ml/g of activated sludge containing a large amount of filamentous bacteria was fed into a 1 L gas washing bottle, and batch ozonization was executed by varying ozone dose (0 to 9.6 mg-O3/g-MLSS). FIG. 8 shows the relationship between ozone dose and SVI, and shows that SVI started to decrease when ozone dose was about 1 mg-O3/g-MLSS and decreased down to about 40% at 10 mg-O3/g-MLSS compared to the value prior to the ozonization, indicating that appropriate sedimentation was recovered.

The then observation with a microscope showed that the structure of the filamentous bacteria was changed by the ozonization. The effect of the recovery of appropriate sedimentation was improved when ozone dose was larger. It is thus evident that ozone dose must be 1 mg-O3/g-MLSS or more in recovering appropriate sedimentation when the sludge cannot sediment appropriately due to filamentous bacteria and that a smaller ozone dose is effective in recovering appropriate sedimentation than in reducing the amount of sludge generated or preventing the sludge from sedimenting inappropriately.

Experiment 8

An intermittent ozonization experiment similar to Experiment 1 using activated sludge containing a large amount of filamentous bacteria was conducted to examine the effects of the treated-sludge ratio on SVI. With respect to the ozonization conditions, ozone dose was 1 mg-O3/g-MLSS and the number of ozonization and the treated-sludge ratio were varied (treated-sludge ratio: 0 to 9.8).

Figure 9:
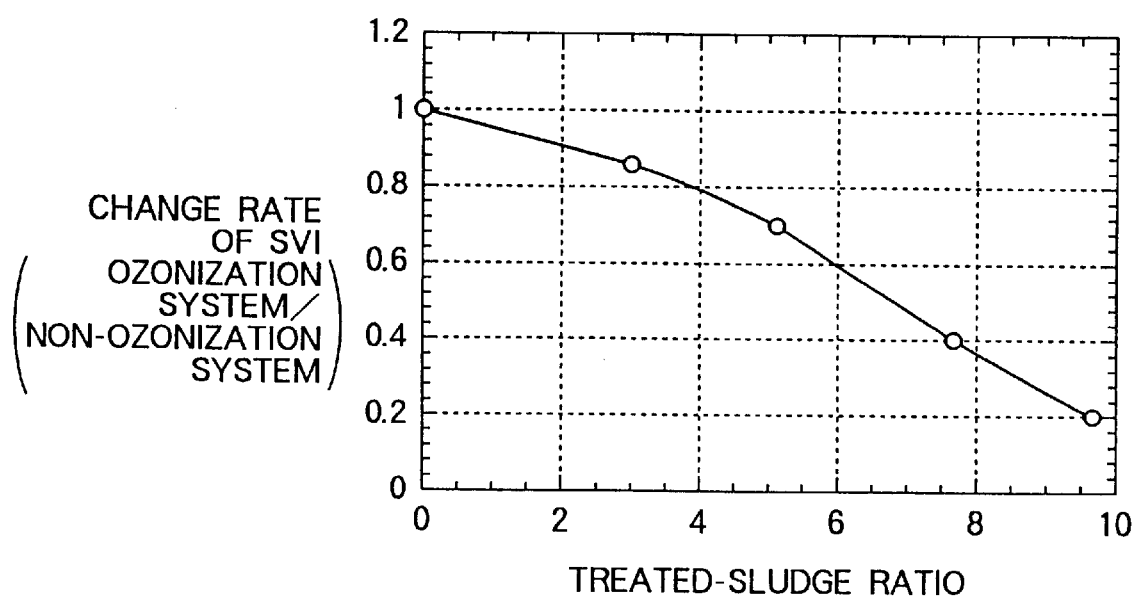
FIG. 9 is a characteristic diagram showing the relationship between the treated-sludge ratio and the change rate of SVI in the experiments concerning this invention.

FIG. 9 shows the relationship between the treated-sludge ratio and the change ratio of SVI, that is, the ratio of the SVI of the ozonization system to the SVI of the SVI of the non-ozonization system, and shows that the effect of SVI decreases with increasing treated-sludge ratio. SVI decreased down to 20% at a treated-sludge ratio of 10.

In addition, even when the treated-sludge ratio was 10, the concentration of TOC in the treated water was almost equal in both ozonization and non-ozonization systems and the treatment performance was not reduced by the ozonization. It is thus evident that to recover the appropriate sedimentation of the sludge, the treated-sludge ratio may be increased compared to the reduction of the amount of sludge generated or the prevention of the sludge from sedimenting inappropriately.

The results of Experiments 6, 7, and 8 show that by drawing activated sludge from the aeration vessel, intermittently ozonizing the sludge, and then returning it to the aeration vessel, this invention can reduce the amount of sludge remaining and preventing the sludge from sedimenting inappropriately or recovering the appropriate sedimentation of the sludge depending on how the sludge sediments by selecting ozonization conditions suitable for both the reduction of the amount of sludge and the prevention of inappropriate sedimentation if the sludge sediments appropriately while selecting ozonization conditions suitable for the recovery of appropriate sedimentation.

Although the intermittent ozonization was provided in Experiments 6 and 8, this embodiment is not limited to this aspect but similar effects can be obtained in continuous ozonization by selecting either ozonization conditions suitable for the reduction of the amount of sludge and the prevention of inappropriate sedimentation or ozonization conditions suitable for the recovery of appropriate sedimentation depending on how the sludge sediments.

Embodiment 5

A waste water ozonization process according to Embodiment 5 of this invention is described. The results of Experiments 6, 7, 8 show that ozone dose desired for the intermittent ozonization of the sludge drawn from the aeration vessel is 10 mg-O3/g-MLSS or more in reducing the amount of sludge generated and preventing the sludge from sedimenting inappropriately or 1 mg-O3/g-MLSS or more in recovering appropriate sedimentation.

In addition, although the intermittent ozonization was provided in Experiments 6 and 8, this embodiment is not limited to this aspect but the same conditions apply to the continuous ozonization. Ozone dose desired for the continuous ozonization is similarly 10 mg-O3/g-MLSS or more in reducing the amount of sludge generated and preventing the sludge from sedimenting inappropriately or 1 mg-O3/g-MLSS or more in recovering appropriate sedimentation.

Embodiment 6

A waste water ozonization process according to Embodiment 6 of this invention is described. The results of Experiments 6, 7, 8 show that the treated-sludge ratio desired for the intermittent ozonization of the sludge drawn from the aeration vessel is 0.5 to 5 in reducing the amount of sludge generated and preventing the sludge from sedimenting inappropriately or 2 to 10 in recovering appropriate sedimentation.

In addition, although the intermittent ozonization was provided in Experiments 6 and 8, this embodiment is not limited to this aspect but the same conditions apply to the continuous ozonization. The treated-sludge ratio desired for the continuous ozonization is similarly 0.5 to 5 in reducing the amount of sludge generated and preventing the sludge from sedimenting inappropriately or 2 to 10 in recovering appropriate sedimentation.

Embodiment 7

Figure 10:
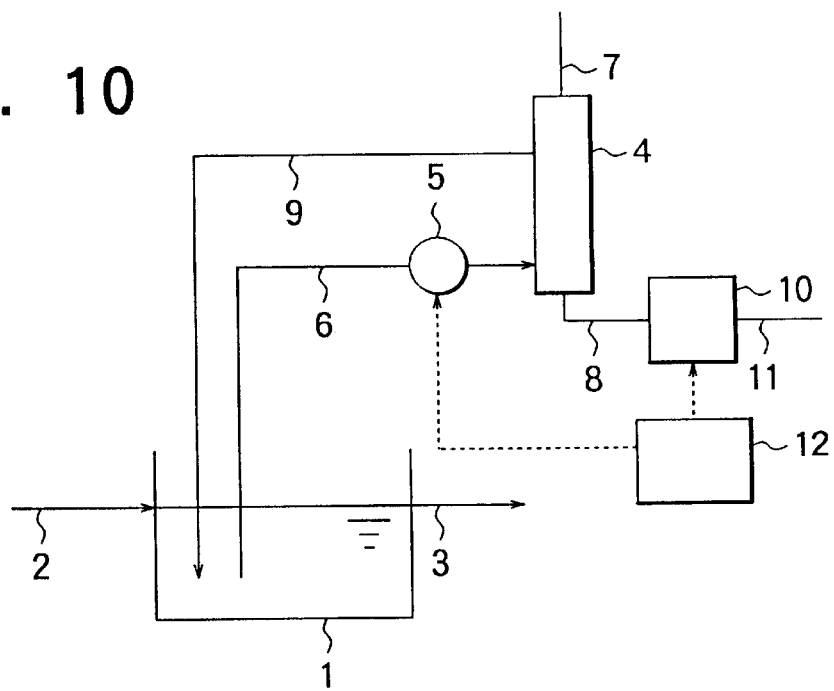
FIG. 10 is a flowchart describing the operation of a waste water treatment apparatus according to another embodiment of this invention.

A waste water ozonization apparatus according to Embodiment 7 of this invention is described below with reference to the drawings. FIG. 10 shows a flow for the waste water ozonization apparatus according to this invention. As shown in this figure, an incoming water channel 2 is connected to the inlet side of an aeration vessel (a microorganism reaction vessel) 1, and an interconnecting channel 3 is connected to the outlet side. In addition, a drawn-sludge channel 6 including a sludge drawing pump (a mixed-liquid drawing means) 5 is connected to both a ozonization vessel (an ozonization means) 4 and the aeration vessel 1. The ozonization vessel 4 connects to an ozone supply channel 8 that supplies ozone, an ozone discharge channel 7 that discharges ozone that has not been used for reaction with sludge, and a ozonized-sludge channel (a mixed-liquid returning means) 9 that returns ozonized sludge to the aeration vessel 1. A diffuser is provided at the bottom of the aeration vessel 1 and is interconnected with an air supply channel and a sludge separation section that is interconnected with both an incoming water channel and a sludge draw-out channel after the interconnecting channel 3. Furthermore, a returned-sludge channel including a sludge returning pump interconnects the sludge draw-out channel and the aeration vessel 1 together. These components, however, are not illustrated.

An ozonizer (an ozone generation means) 10 is provided in the middle of the ozone supply channel 8. The ozonizer 10 generates an ozone gas (hereafter referred to as "ozone") from a material gas supplied from a material gas supply channel 11, and supplies the ozone to the ozonization vessel 4 via the ozone supply channel 8. The sludge drawing pump 5 and the ozonizer 10 are controlled and adjusted by a control section (a control means) 12.

Next, the operation of this embodiment is explained. Organic waste water is introduced into the aeration vessel 1 through the incoming water channel 2, and aerobic treatment is provided in the aeration vessel 1. Then, the mixed-liquid in the aeration vessel 1 is delivered through the interconnecting channel 3 to the sludge separation section for solid-liquid separation, and the separated liquid is discharged.

During this waste water treatment process, the sludge drawing pump 5 is operated to introduce the sludge-mixed liquid into the ozonization vessel 4 via the drawn-sludge channel 6 and then to return it to the aeration vessel 1 through the ozonized sludge channel 9 so that the sludge in the aeration vessel 1 is circulated.

The ozonizer 10 generates ozone using as a material gas an oxygen gas or air supplied through the material gas supply channel 11 and injects the ozone into the ozonization vessel 4 through the ozone supply channel 8. In the ozonization vessel 4, the ozone is contacted with sludge circulated by the sludge drawing pump 5 in order to react the sludge and ozone together. In this case, ozone not used for the reaction with sludge is discharged through the ozone discharge channel 7.

After a specified period of time, the ozonizer 10 stops generating ozone, and after the sludge in the ozonization vessel 4 has been sufficiently replaced for the sludge in the aeration vessel 1, the sludge drawing pump 5 is stopped.

This series of operations constitute one intermittent ozonization cycle, and the control section 12 operates the sludge drawing pump 5 and the ozonizer 10 so as to provide a suitable amount of ozone injected per cycle, a suitable number of cycles per day, and a suitable cycle interval for reducing the amount of sludge generated and preventing the sludge from sedimenting inappropriately or recovering appropriate sedimentation.

If the activated sludge sediments appropriately, an operation is performed that is suitable for the reduction of the amount of sludge and the prevention of inappropriate sedimentation. The activated sludge is ozonized to kill activated-sludge microorganisms and is further solubilized and made inorganic. Then, the sludge is returned to the aeration vessel where it is decomposed into a substrate (feed) for microorganisms in the aeration vessel to reduce the amount of sludge corresponding to carbon dioxide otherwise generated in this case. Since the intermittent ozonization of the sludge enables ozone of a high concentration to be collectively injected to increase the amount of ozone injected per hour during ozonization, allowing the microorganisms in the sludge to be further solubilized and made inorganic and improving decomposition back in the aeration vessel, compared to the continuous ozonization. As a result, the effect of the reduction of sludge generated is larger in the intermittent ozonization than in the continuous ozonization, and the intermittent ozonization enables the amount of sludge generated to be substantially reduced using a much smaller amount of ozone injected than in the continuous ozonization.

In addition, the ozonization simultaneously kills filamentous bacteria in the sludge, thereby preventing filamentous bacteria from being excessively multiplying to preclude the inappropriate sedimentation of the sludge caused by the filamentous bacteria.

On the contrary, if filamentous bacteria excessively multiply to cause the sludge to sediment inappropriately, then in contrast to the case in which the activated sludge sediments appropriately, an operation can be performed using an effective amount of ozone injected per cycle, an effective number of cycles per day, and an effective cycle interval in killing the excessively multiplied filamentous bacteria to recover appropriate sedimentation.

Although the above example operates the sludge drawing pump 5 only during the series of operations for the intermittent ozonization, similar effects can be obtained by constantly operating the sludge drawing pump 5.

In addition, although the above example operates the sludge drawing pump 5 during ozonization, similar effects can be obtained if the sludge drawing pump 5 is stopped during ozonization. If the sludge drawing pump 5 is stopped during ozonization in this manner, the sludge cannot only be circulated to the ozonization vessel 4 through the drawn-sludge channel 6 and ozonized sludge channel 9 but a pump capable of changing the direction of the liquid can also be used as the sludge drawing pump 5 to introduce the sludge into the ozonization reaction vessel for ozonization and then to return the ozonized sludge to the aeration vessel 1 when operated in the reverse direction.

In addition to the sludge drawing pump 5, a pump for returning the ozonized sludge to the aeration vessel 1 may be installed in the ozonized-sludge channel 6, and these two pumps may be operated.

Although the above example provides the ozonization vessel 4 to ozonize the sludge, this embodiment is not limited to this aspect but similar effects can be obtained by partitioning the aeration vessel 1, using a partitioned portion as the ozonization vessel, circulating the sludge through the vessel, and intermittently injecting ozone into the sludge.

Embodiment 8

Figure 11:
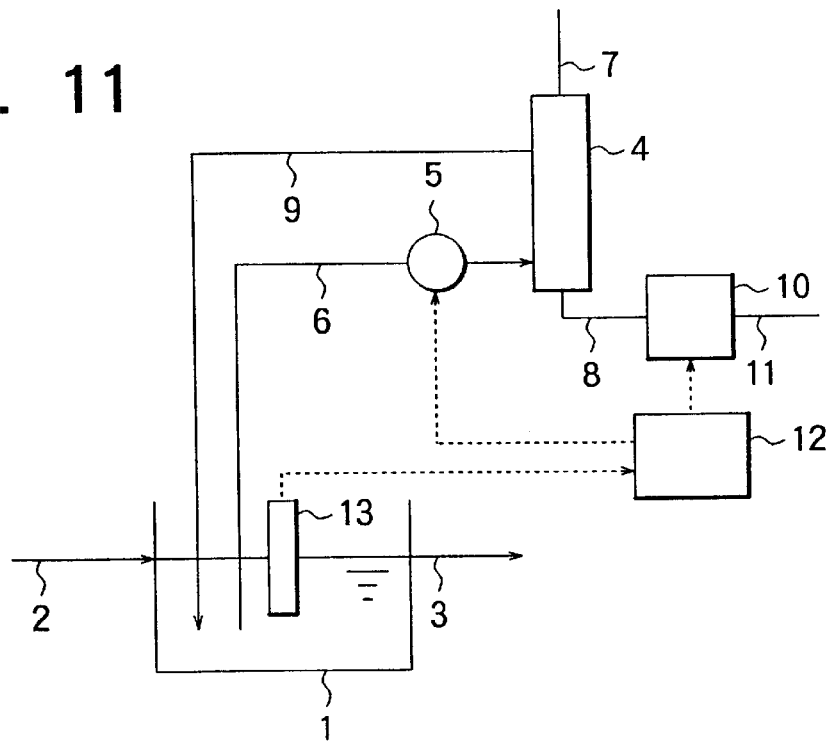
FIG. 11 is a flowchart describing the operation of a waste water treatment apparatus according to another embodiment of this invention.

Then, a waste water ozonization apparatus according to Embodiment 8 is explained with reference to the drawings. FIG. 11 shows a flow for the ozonization apparatus according to this invention. In this figure, 13 is an SV measuring device for automatically measuring the SV (Sludge Volume) of the activated sludge in the aeration vessel 1, and the other components are the same as in FIG. 10.

Next, the operation is explained. During the waste water treatment in the aeration vessel 1, the sludge drawing pump 5 is operated to circulate the sludge-mixed liquid in the aeration vessel 1 through the drawn-sludge channel 6, ozonization vessel 4, and ozonized-sludge channel 9. The ozonizer 10 generates ozone using as a material gas an oxygen gas or air supplied through the material gas supply channel 11, and the ozone is injected into the ozonization vessel 4 through the ozone supply channel 8 to ozonize the sludge. The ozone that has not been used for reaction with the sludge is discharged through the discharged-ozone channel 7. This series of operations are continuously performed, and the control section 12 operates the sludge drawing pump 5 and the ozonizer 10 so as to provide a suitable amount of ozone injected and a suitable circulated flow of sludge for reducing the amount of sludge generated and preventing the sludge from sedimenting inappropriately or recovering appropriate sedimentation.

During the continuous ozonization, the SV measuring device 13 measures the SV of the sludge to input the result of the measurement to the control section 12. On receiving the input, the control section 12 sets the amount of ozone injected and the circulated flow of sludge based on this result and operates the sludge drawing pump 5 and the ozonizer 10 depending on these settings.

If the sludge sediments appropriately, the SV value is small. If an input signal from the SV measuring device 13 is lower than or equal to a value preset based on a normal SV value, the control section 12 determines that the activated sludge sediments appropriately and sets a suitable amount of ozone injected and a suitable circulated flow of sludge for reducing the amount of sludge generated and preventing the sludge from sedimenting inappropriately to operate the sludge drawing pump 5 and the ozonizer 10 depending on these settings.

On the other hand, if the sludge tends to sediment inappropriately or the sedimentation has become completely inappropriate, the SV value increases depending on the degree of inappropriateness. If an input signal from the SV measuring device 13 is higher than the value preset based on the normal SV value, the control section 12 determines that the activated sludge sediments inappropriately and sets a suitable amount of ozone injected and a suitable circulated flow of sludge for recovering appropriate sedimentation to operate the sludge drawing pump 5 and the ozonizer 10 depending on these settings.

By varying the amount of ozone injected and the circulated flow of sludge according to the SV value of the activated sludge in the aeration vessel as described above, adequate ozonization can be provided depending on how the activated sludge sediments in order to stably obtain effects in reducing the amount of sludge generated and preventing the sludge from sedimenting inappropriately or recovering appropriate sedimentation.

Although the above example executes the continuous ozonization of the sludge, this embodiment is not limited to this aspect but more efficient operations can be performed by the intermittent ozonization.

The operation of the intermittent ozonization is similar to that in Embodiment 7, and the control section 12 sets amount of ozone injected per cycle, the number of cycles per day, and the cycle interval required for the intermittent ozonization, according to a measured value from the SV measuring device 13, and operates the sludge drawing pump 5 and the ozonizer 10 depending on these settings.

By varying the amount of ozone injected per cycle, the number of cycles per day, and the cycle interval according to the SV value of the activated sludge in the aeration vessel, adequate ozonization can be provided depending on how the activated sludge sediments in order to stably obtain effects in reducing the amount of sludge generated and preventing the sludge from sedimenting inappropriately or recovering appropriate sedimentation. In addition, the intermittent ozonization enables the reduction of the amount of sludge generated and the prevention of inappropriate sedimentation or the recovery of appropriate sedimentation to be achieved using a much smaller amount of ozone injected than the continuous ozonization.

Although the above example measures the SV of the activated sludge, this embodiment is not limited to this aspect, similar effects can be obtained using any sedimentation-related index such as SVI, the sedimentation speed of an activated-sludge floc or the particle size of the activated-sludge floc. Furthermore, multiple such indices may be combined together.

Although the above example uses the automatic measuring device, this embodiment is not limited to this aspect but similar effects can be obtained by determining through manual analysis an index concerning the sedimentation of the activated-sludge floc and inputting the value obtained to the control section.

Embodiment 9

Figure 12:
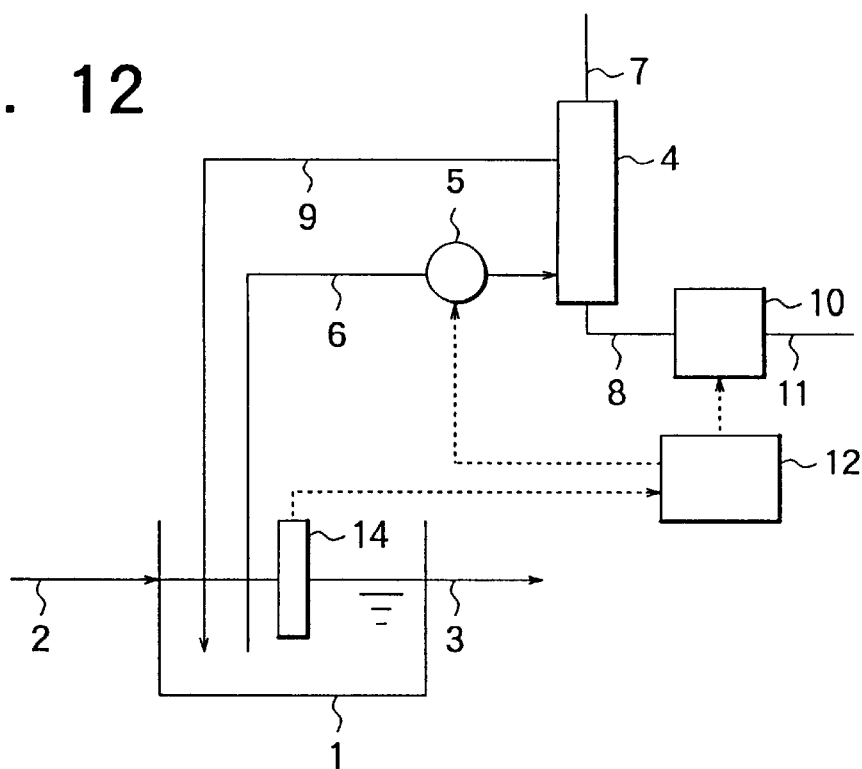
FIG. 12 is a flowchart describing the operation of a waste water treatment apparatus according to another embodiment of this invention.

Then, a waste water ozonization apparatus according to Embodiment 9 of this invention is described with reference to the drawings. FIG. 12 shows a flow for the waste water ozonization apparatus according to this invention. In this figure, 14 is a respiratory-activity measuring device for automatically measuring the respiratory activity of the activated sludge in the aeration vessel 1, and the other components are the same as in FIG. 10.

Next, the operation is explained. During the waste water treatment in the aeration vessel 1, the sludge drawing pump 5 is operated to circulate the sludge-mixed liquid in the aeration vessel 1 through the drawn-sludge channel 6, ozonization vessel 4, and ozonized-sludge channel 9. The ozonizer 10 generates ozone using as a material gas an oxygen gas or air supplied through the material gas supply channel 11, and the ozone is injected into the ozonization vessel 4 through the ozone supply channel 8 to ozonize the sludge. The ozone that has not been used for reaction with the sludge is discharged through the discharged-ozone channel 7. This series of operations are continuously performed, and the control section 12 operates the sludge drawing pump 5 and the ozonizer 10 so as to provide a suitable amount of ozone injected and a suitable circulated flow of sludge for reducing the amount of sludge generated and preventing the sludge from sedimenting inappropriately or recovering appropriate sedimentation.

During the continuous ozonization, the respiratory-activity measuring device 14 measures the respiratory activity of the activated sludge to input the result of the measurement to the control section 12. On receiving the input, the control section 12 sets the amount of ozone injected and the circulated flow of sludge based on this result and operates the sludge drawing pump 5 and the ozonizer 10 depending on these settings.

If the organic substances are decomposed appropriately by activated sludge, the respiratory-activity value is high. If an input signal from the respiratory-activity measuring device 14 is higher than or equal to a value preset based on a normal respiratory-activity value, the control section 12 determines that the organism decomposition activity of the activated sludge is appropriate and sets a suitable amount of ozone injected and a suitable circulated flow of sludge for reducing the amount of sludge generated and preventing the sludge from sedimenting inappropriately or recovering appropriate sedimentation in order to operate the sludge drawing pump 5 and the ozonizer 10 depending on these settings.

On the other hand, if the organic substances decomposition activity of the activated sludge in the aeration vessel decreases due to an external factor such as a qualitative change in the incoming waste water or the excessive injection of ozone, the respiratory activity decreases. If the sludge is ozonized while the organic substances decomposition activity of the activated sludge is low, the organic substances decomposition activity of the activated sludge may further decrease to substantially degrade the quality of treated water. If an input signal from the respiratory-activity measuring device 14 is lower than the value preset based on the normal respiratory-activity value, the control section 12 determines that the organic substances decomposition activity of the activated sludge in the aeration vessel is inappropriate, and sets conditions for restraining the ozonization by reducing the amount of ozone injected and the circulated flow of sludge depending on the degree of the decrease in the respiratory-activity value in order to operate the sludge drawing pump 5 and the ozonizer 10 depending on the conditions.

By varying the amount of ozone injected and the circulated flow of sludge according to the respiratory-activity value of the activated sludge in the aeration vessel as described above, adequate ozonization can be provided depending on the organic substances decomposition activity of the activated sludge in order to stably obtain effects in reducing the amount of sludge generated and preventing the sludge from sedimenting inappropriately or recovering appropriate sedimentation while recovering the organic substances decomposition activity of the activated sludge and avoiding the degradation of the quality of treated water.

Although the above example executes the continuous ozonization of the sludge, this embodiment is not limited to this aspect but more efficient operations can be performed by the intermittent ozonization.

The operation of the intermittent ozonization is similar to that in Embodiment 7, and the control section 12 sets the amount of ozone injected per cycle, the number of cycles per day, and the cycle interval required for the intermittent ozonization, according to a measured value from the respiratory-activity measuring device 14, and operates the sludge drawing pump 5 and the ozonizer 10 depending on these settings.

By varying the amount of ozone injected per cycle, the number of cycles per day, and the cycle interval according to the respiratory-activity value of the activated sludge in the aeration vessel, adequate ozonization can be provided depending on the organic substances decomposition activity of the activated sludge in order to stably obtain effects in reducing the amount of sludge generated and preventing the sludge from sedimenting inappropriately or recovering appropriate sedimentation while recovering the organic substances decomposition activity of the activated sludge and avoiding the degradation of the quality of treated water. In addition, the intermittent ozonization enables the reduction of the amount of sludge generated and the prevention of inappropriate sedimentation or the recovery of appropriate sedimentation to be achieved using a much smaller amount of ozone injected than the continuous ozonization.

Although the above example measures the respiratory activity of the activated sludge, this embodiment is not limited to this aspect, similar effects can be obtained using any other organic substances-decomposition-activity-related index such as the dehydrogenase activity or the amount of ATP or NADH. Furthermore, multiple such indices may be combined together.

Although the above example uses the automatic measuring device, this embodiment is not limited to this aspect but similar effects can be obtained by determining through manual analysis an index concerning the organic substances decomposition activity of the activated sludge and inputting the value obtained to the control section.

Although the above example varies the ozonization conditions depending on the index value such as the respiratory activity which concerns the organic substances decomposition activity of the activated sludge, more effective operations can be performed by measuring an index such as SV concerning the sedimentation of the activated sludge, together with the organic substances decomposition activity index such as the respiratory activity and varying the amount of ozone injected, the circulated flow of sludge, the number of cycles, and the cycle interval depending on these two measured values.

Embodiment 10

Figure 13:
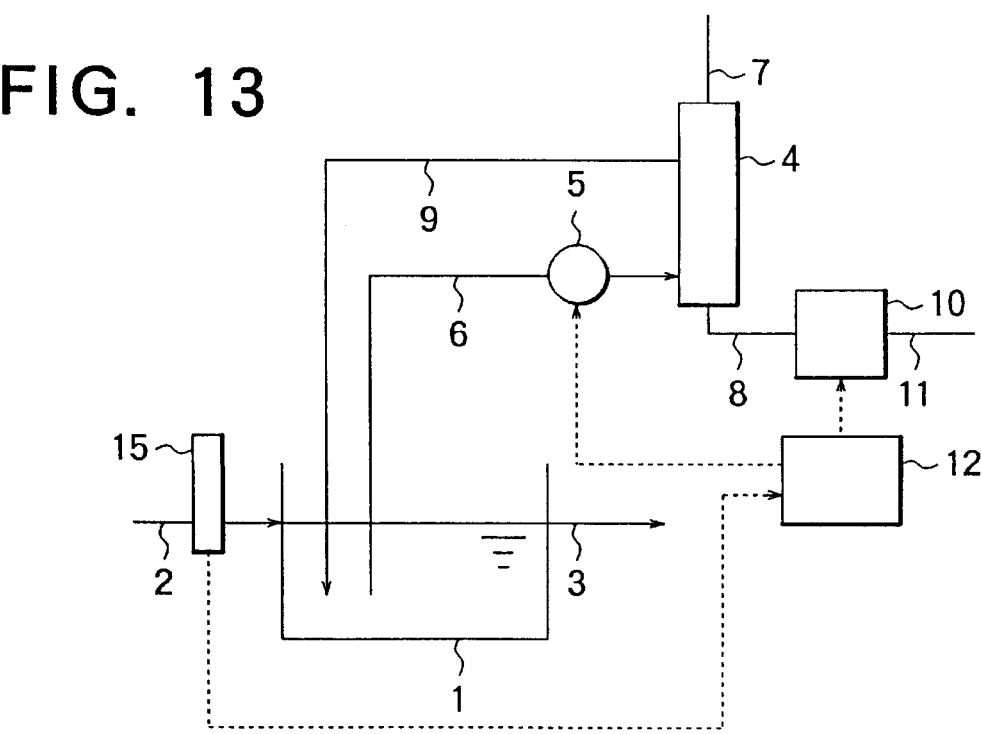
FIG. 13 is a flowchart describing the operation of a waste water treatment apparatus according to another embodiment of this invention.

Then, a waste water ozonization apparatus according to Embodiment 10 of this invention is described with reference to the drawings. FIG. 13 shows a flow for the waste water ozonization apparatus according to this invention. In this figure, 15 is a TOC concentration measuring device for automatically measuring the concentration of TOC in waste water flowing through the incoming water channel 2, and the other components are the same as in FIG. 10.

Next, the operation is explained. During the waste water treatment in the aeration vessel 1, the sludge drawing pump 5 is operated to circulate the sludge-mixed liquid in the aeration vessel 1 through the drawn-sludge channel 6, ozonization vessel 4, and ozonized-sludge channel 9. The ozonizer 10 generates ozone using as a material gas an oxygen gas or air supplied through the material gas supply channel 11, and the ozone is injected into the ozonization vessel 4 through the ozone supply channel 8 to ozonize the sludge. The ozone that has not been used for reaction with the sludge is discharged through the discharged-ozone channel 7. This series of operations are continuously performed, and the control section 12 operates the sludge drawing pump 5 and the ozonizer 10 so as to provide a suitable amount of ozone injected and a suitable circulated flow of sludge for reducing the amount of sludge generated and preventing the sludge from sedimenting inappropriately or recovering appropriate sedimentation.

During the continuous ozonization, the TOC concentration measuring device 15 measures the concentration of TOC in the incoming waste water to input the result of the measurement to the control section 12. On receiving the input, the control section 12 sets the amount of ozone injected and the circulated flow of sludge based on this result and operates the sludge drawing pump 5 and the ozonizer 10 depending on these settings.

The concentration of TOC in the incoming waste water varies with time. During nighttime or holidays, the concentration of TOC in the incoming waste water is often low, so the organic load on the activated sludge in the aeration vessel is light. If an input signal from the TOC concentration measuring device 15 is lower than or equal to a value preset based on a normal TOC concentration value, the control section 12 determines that the incoming organic load is light and sets a suitable amount of ozone injected and a suitable circulated flow of sludge for reducing the amount of sludge generated and preventing the sludge from sedimenting inappropriately or recovering appropriate sedimentation in order to operate the sludge drawing pump 5 and the ozonizer 10 depending on these settings.

On the other hand, during a time zone such as daytime during which lives and industries are active, the concentration of TOC in the incoming waste water is high, so the organic load on the activated sludge in the aeration vessel may increase. If the sludge is ozonized while there is a heavy organic load, the load on the activated sludge in the aeration vessel may further increase to substantially degrade the quality of treated water. If an input signal from the TOC concentration measuring device 15 is higher than the set value, the control section 12 determines that the incoming organic load is heavy, and sets conditions for restraining the ozonization by reducing the amount of ozone injected and the circulated flow of sludge depending on the TOC concentration value in order to operate the sludge drawing pump 5 and the ozonizer 10 depending on the conditions.

By varying the amount of ozone injected and the circulated flow of sludge according to the value of the concentration of TOC in the incoming waste water as described above, adequate ozonization can be provided depending on the organic load in order to stably obtain effects in reducing the amount of sludge generated and preventing the sludge from sedimenting inappropriately or recovering appropriate sedimentation while uniformizing the organic load on the activated sludge in the aeration vessel and avoiding the degradation of the quality of treated water and increase in required aeration caused by the increase in load.

Although the above example executes the continuous ozonization of the sludge, this embodiment is not limited to this aspect but more efficient operations can be performed by the intermittent ozonization.

The operation of the intermittent ozonization is similar to that in Embodiment 7, and the control section 12 sets the amount of ozone injected per cycle, the number of cycles per day, and the cycle interval required for the intermittent ozonization, according to a measured value from the TOC concentration measuring device 15, and operates the sludge drawing pump 5 and the ozonizer 10 depending on these settings.

By varying the amount of ozone injected per cycle, the number of cycles per day, and the cycle interval according to the concentration of TOC in the incoming waste water, adequate ozonization can be provided depending on the organism load on the activated sludge in the aeration vessel in order to stably obtain effects in reducing the amount of sludge generated and preventing the sludge from sedimenting inappropriately or recovering appropriate sedimentation while uniformizing the organic load on the activated sludge in the aeration vessel and avoiding the degradation of the quality of treated water and increase in required aeration caused by the increase in load. In addition, the intermittent ozonization enables the reduction of the amount of sludge generated and the prevention of inappropriate sedimentation or the recovery of appropriate sedimentation to be achieved using a much smaller amount of ozone injected than the continuous ozonization.

Although the above example measures the concentration of TOC in the incoming waste water, this embodiment is not limited to this aspect, similar effects can be obtained using a subaqueous-organic substances index such as the concentration of COD or BOD. Furthermore, multiple such indices may be combined together.

Although the above example measures the concentration of TOC in the incoming waste water, this embodiment is not limited to this aspect, similar effects can be obtained using another index such as the flow of incoming waste water which relates to the incoming organic load. Furthermore, multiple such indices may be combined together.

Although the above example uses the automatic measuring device, this embodiment is not limited to this aspect but similar effects can be obtained by determining through manual analysis an index concerning the incoming organic load and inputting the value obtained to the control section.

If temporal changes in the concentration of organic substances in the incoming waste water or its flow are roughly constant and the pattern of the incoming organic load can be estimated, constant measurements are not required and similar effects can be obtained by setting the amount of ozone injected, the circulated flow of sludge, the number of cycles, and the cycle interval depending on the load pattern in order to operate the sludge drawing pump 5 and ozonizer 10 accordingly.

Although the above example varies the ozonization conditions depending on the index value such as the concentration of TOC in the incoming waste water which relates to the incoming organic load, more effective operations can be performed by measuring an index such as SV concerning the sedimentation of the activated sludge and/or an organic substance decomposition activity index such as the respiratory activity, together with the incoming organic load index such as the concentration of TOC in the incoming waste water and varying the amount of ozone injected, the circulated flow of sludge, the number of cycles, and the cycle interval depending on the various measured values.

Embodiment 11

Figure 14:
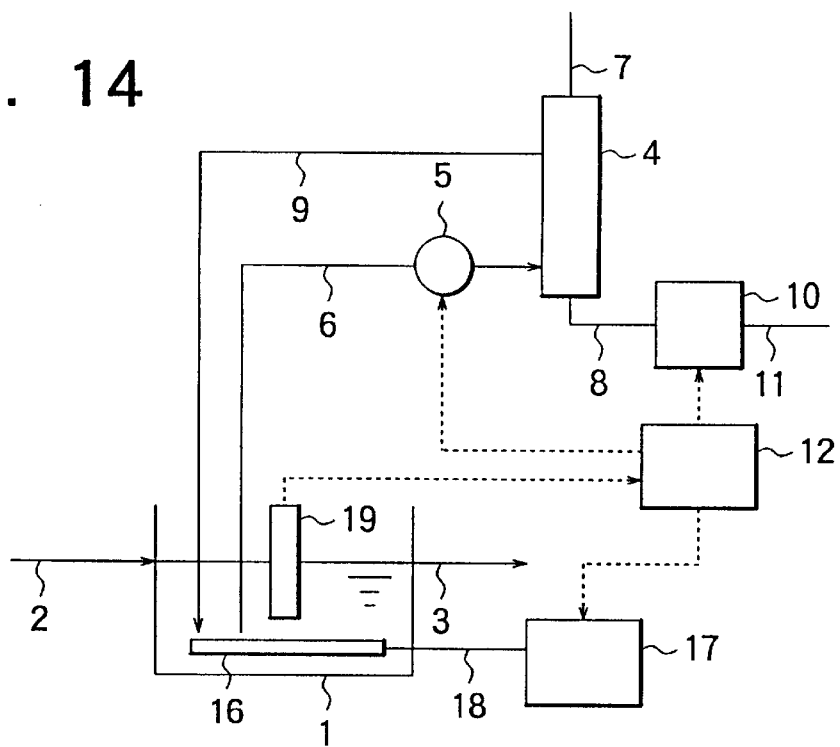
FIG. 14 is a flowchart describing the operation of a waste water treatment apparatus according to another embodiment of this invention.

Then, a waste water ozonization apparatus according to Embodiment 11 of this invention is described with reference to the drawings. FIG. 14 shows a flow for the waste water ozonization apparatus according to this invention. In this figure, 16 is a diffuser provided at the bottom of the aeration vessel 1; 17 is an air supply device for supplying air to the diffuser 16; 18 is an air supply channel that interconnects the diffuser and the air supply device together; 19 is a dissolved-oxygen concentration measuring device for automatically measuring the concentration of dissolves oxygen in the activated-sludge-mixed liquid, and the other components are the same as in FIG. 10.

Next, the operation is explained. During the waste water treatment in the aeration vessel 1, the sludge drawing pump 5 is operated to circulate the sludge-mixed liquid in the aeration vessel 1 through the drawn-sludge channel 6, ozonization vessel 4, and ozonized-sludge channel 9. The ozonizer 10 generates ozone using as a material gas an oxygen gas or air supplied through the material gas supply channel 11, and the ozone is injected into the ozonization vessel 4 through the ozone supply channel 8 to ozonize the sludge. The ozone that has not been used for reaction with the sludge is discharged through the discharged-ozone channel 7. This series of operations are continuously performed, and the control section 12 operates the sludge drawing pump 5 and the ozonizer 10 so as to provide a suitable amount of ozone injected and a suitable circulated flow of sludge for reducing the amount of sludge generated and preventing the sludge from sedimenting inappropriately or recovering appropriate sedimentation.

During the continuous ozonization, the dissolved-oxygen concentration measuring device 19 measures the concentration of dissolved oxygen in the activated-sludge-mixed liquid in the aeration vessel 1 to input the result of the measurement to the control section 12. On receiving the input, the control section 12 sets the amount of ozone injected, the circulated flow of sludge, and the amount of air supplied to the aeration vessel based on this result and operates the sludge drawing pump 5, the ozonizer 10, and the air supply device 17 depending on these settings.

The concentration of dissolved oxygen in the activated-sludge-mixed liquid varies with the incoming load or the organic substances decomposition activity of the activated sludge. The concentration of dissolved oxygen must be set within an appropriate range in order to maintain the multiplication and metabolism of microorganisms and to allow waste water to be treated appropriately. If an input signal from the dissolved-oxygen concentration measuring device 19 is within a range preset based on a normal concentration of dissolved oxygen, the control section 12 determines that the concentration of dissolved oxygen in the activated-sludge-mixed liquid is appropriate and sets a suitable amount of ozone injected and a suitable circulated flow of sludge for reducing the amount of sludge generated and preventing the sludge from sedimenting inappropriately or recovering appropriate sedimentation in order to operate the sludge drawing pump 5, the ozonizer 10, and the air supply device 17 depending on these settings.

On the other hand, if the organism load on the activated sludge in the aeration vessel 1 increases due to an increase in the concentration of organic substances in the incoming waste water or the sludge returned to the aeration vessel 1 after ozonization, the concentration of dissolved oxygen in the activated-sludge-mixed liquid decreases. If the sludge is ozonized while the organic load is heavy, the organic load on the activated sludge in the aeration vessel may further increase to substantially degrade the quality of treated water. If an input signal from the dissolved-oxygen concentration measuring device 19 is lower than the set range, the control section 12 determines that the incoming organic load is heavy, and sets conditions for restraining the ozonization by reducing the amount of ozone injected and the circulated flow of sludge depending on the degree of the decrease in the concentration of dissolved oxygen in order to operate the sludge drawing pump 5, the ozonizer 10, and the air supply device 17 depending on the conditions.

In addition, if the organic substances decomposition activity of the activated sludge in the aeration vessel decreases due to an external factor such as a qualitative change in the incoming waste water and change in temperature or the excessive injection of ozone, the supplied oxygen is not used for the activities of the microorganisms in the activated sludge and the concentration of dissolved oxygen in the activated-sludge-mixed liquid increases. If the sludge is ozonized while the organic substances decomposition activity of the activated sludge is low, the organic substances decomposition activity of the activated sludge may further decrease to substantially degrade the quality of treated water. If an input signal from the dissolved-oxygen concentration measuring device 19 is higher than the set range, the control section 12 determines that the organic substances decomposition activity of the activated sludge in the aeration vessel is low, and sets conditions for restraining the ozonization by reducing the amount of ozone injected and the circulated flow of sludge depending on the degree of the increase in the concentration of dissolved oxygen in order to operate the sludge drawing pump 5, the ozonizer 10 and the air supply device 17 depending on the conditions.

If the organic load on the activated sludge in the aeration vessel decreases due to a decrease in the concentration of organic substances in the incoming waste water or in the amount of incoming waste water, the concentration of dissolved oxygen in the activated-sludge-mixed liquid increases. If temporal changes in the concentration of organic substances in the incoming waste water or its flow are roughly constant, the pattern of the incoming organic load can be estimated, and the increase in the concentration of dissolved oxygen can be clearly determined to be caused by the decrease in the organic load, the control section 12, receiving an input signal higher than the set range from the dissolved-oxygen concentration measuring device 19, determines that the incoming organic load is light, and sets conditions by increasing the amount of ozone injected and the circulated flow of sludge depending on the degree of the increase in the concentration of dissolved oxygen in order to operate the sludge drawing pump 5, the ozonizer 10 and the air supply device 17 depending on the conditions.

By varying the amount of ozone injected, the circulated flow of sludge, and the amount of air supplied according to the value of the concentration of dissolved oxygen in the activated-sludge-mixed liquid in the aeration vessel as described above, adequate ozonization can be provided depending on the organic load on the activated sludge in the aeration vessel or the organic substances decomposition activity of the activated sludge in order to stably obtain effects in reducing the amount of sludge generated and preventing the sludge from sedimenting inappropriately or recovering appropriate sedimentation while avoiding the degradation of the quality of treated water associated with the increase or decrease in load or the change in activity.

Although the above example executes the continuous ozonization of the sludge, this embodiment is not limited to this aspect but more efficient operations can be performed by the intermittent ozonization.

The operation of the intermittent ozonization is similar to that in Embodiment 7, and the control section 12 sets the amount of ozone injected per cycle, the number of cycles per day, the cycle interval, and the amount of air supplied to the aeration vessel required for the intermittent ozonization, according to a measured value from the dissolved-oxygen concentration measuring device 19, and operates the sludge drawing pump 5, the ozonizer 10, the air supply device 17 depending on these settings.

By varying the amount of ozone injected per cycle, the number of cycles per day, the cycle interval, and the amount of air supplied according to the value of the concentration of dissolved oxygen in the activated-sludge-mixed liquid in the aeration vessel, adequate ozonization can be provided depending on the organic load on the activated sludge in the aeration vessel or the organic substances decomposition activity of the activated sludge in order to stably obtain effects in reducing the amount of sludge generated and preventing the sludge from sedimenting inappropriately or recovering appropriate sedimentation while avoiding the degradation of the quality of treated water associated with the increase or decrease in load or the change in activity. In addition, the intermittent ozonization enables the reduction of the amount of sludge generated and the prevention of inappropriate sedimentation or the recovery of appropriate sedimentation to be achieved using a much smaller amount of ozone injected than the continuous ozonization.

Although the above example uses the automatic measuring device, this embodiment is not limited to this aspect but similar effects can be obtained by determining through manual analysis the concentration of dissolved oxygen in the activated-sludge-mixed liquid and inputting the value obtained to the control section.

Although the above example varies the ozonization conditions depending on the concentration of dissolved oxygen in the activated-sludge-mixed liquid, more effective operations can be performed by measuring an index such as SV concerning the sedimentation of the activated sludge, an organic substances decomposition activity index such as the respiratory activity, or an incoming organic load index such as the concentration of TOC in the incoming waste water, together with the concentration of dissolved oxygen in the activated-sludge-mixed liquid and varying the amount of ozone injected, the circulated flow of sludge, the number of cycles, the cycle interval, and the amount of air supplied depending on these various measured values.

In particular, using a combination with the organic substances decomposition activity index such as the respiratory activity or the incoming organic load index such as the concentration of TOC in the incoming waste water, the increase or decrease in load or the change in activity can be determined more adequately to enable more effective operations.

Embodiment 12

Figure 15:
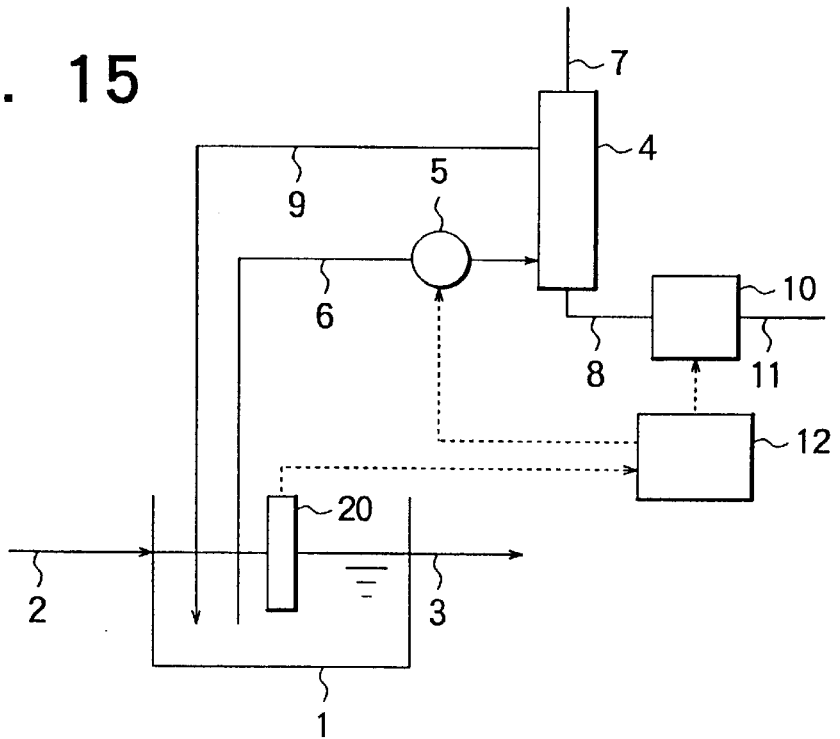
FIG. 15 is a flowchart describing the operation of a waste water treatment apparatus according to another embodiment of this invention.

Then, a waste water ozonization apparatus according to Embodiment 12 of this invention is described with reference to the drawings. FIG. 15 shows a flow for the waste water ozonization apparatus according to this invention. In this figure, 20 is a polysaccharide concentration measuring device for automatically measuring the concentration of polysaccharide in the activated-sludge floc in the aeration vessel 1, and the other components are the same as in FIG. 10.

Next, the operation is explained. During the waste water treatment in the aeration vessel 1, the sludge drawing pump 5 is operated to circulate the sludge-mixed liquid in the aeration vessel 1 through the drawn-sludge channel 6, ozonization vessel 4, and ozonized-sludge channel 9. The ozonizer 10 generates ozone using as a material gas an oxygen gas or air supplied through the material gas supply channel 11, and the ozone is injected into the ozonization vessel 4 through the ozone supply channel 8 to ozonize the sludge. The ozone that has not been used for reaction with the sludge is discharged through the discharged-ozone channel 7. This series of operations are continuously preformed, and the control section 12 operates the sludge drawing pump 5 and the ozonizer 10 so as to provide a suitable amount of ozone injected and a suitable circulated flow of sludge for reducing the amount of sludge generated and preventing the sludge from sedimenting inappropriately or recovering appropriate sedimentation.

During the continuous ozonization, the polysaccharide concentration measuring device 20 measures the concentration of polysaccharide in the activated-sludge floc to input the result of the measurement to the control section 12. On receiving the input, the control section 12 sets the amount of ozone injected and the circulated flow of sludge based on this result and operates the sludge drawing pump 5 and the ozonizer 10 depending on these settings.

The activated-sludge floc is composed of extracellular organic substances such as polysaccharide as well as microorganisms. The amount and composition of extracellular organic substances vary due to an external factor such as a qualitative change in waste water or a change in temperature. If there are an excessive amount of extracellular organic substances in the floc, the top priority is given to the extracellular organic substances during ozonization, thereby obstructing the reaction between the ozone and microorganisms to reduce the effects of the ozonization.

If an input signal from the polysaccharide concentration measuring device 20 is lower than or equal to a value preset based on a normal polysaccharide concentration, the control section 12 determines that the amount of extracellular organic substances in the activated-sludge floc is normal, and sets a suitable amount of ozone injected and a suitable circulated flow of sludge for reducing the amount of sludge generated and preventing the sludge from sedimenting inappropriately or recovering appropriate sedimentation in order to operate the sludge drawing pump 5 and the ozonizer 10 depending on these settings.

If an input signal from the polysaccharide concentration measuring device 20 is higher than the set value, the control section 12 determines that the amount of extracellular organic substances in the activated-sludge floc is excessively large, and sets conditions for enhancing the ozonization by increasing the amount of ozone injected and the circulated flow of sludge depending on the degree of the increase in the concentration of polysaccharide in order to operate the sludge drawing pump 5 and the ozonizer 10 depending on these conditions.

By varying the amount of ozone injected and the circulated flow of sludge according to the value of the concentration of polysaccharide in the activated-sludge floc in the aeration vessel as described above, adequate ozonization can be provided depending on the concentration of polysaccharide that is an extracellular organic substances in a sludge floc, and ozone can be injected taking into consideration the amount of ozone consumed by reaction with extracellular organic substances in order to stably obtain effects in reducing the amount of sludge generated and preventing the sludge from sedimenting inappropriately or recovering appropriate sedimentation.

Although the above example executes the continuous ozonization of the sludge, this embodiment is not limited to this aspect but more efficient operations can be performed by the intermittent ozonization.

The operation of the intermittent ozonization is similar to that in Embodiment 7, and the control section 12 sets the amount of ozone injected per cycle, the number of cycles per day, and the cycle interval required for the intermittent ozonization, according to a measured value from the polysaccharide concentration measuring device 20, and operates the sludge drawing pump 5 and the ozonizer 10 depending on these settings.

By varying the amount of ozone injected per cycle, the number of cycles per day, and the cycle interval according to the concentration of polysaccharide in the activated-sludge floc in the aeration vessel, adequate ozonization can be provided depending on the concentration of polysaccharide that is an extracellular organic substances in a sludge floc, and ozone can be injected taking into consideration the amount of ozone consumed by reaction with extracellular organic substances in order to stably obtain effects in reducing the amount of sludge generated and preventing the sludge from sedimenting inappropriately or recovering appropriate sedimentation. In addition, the intermittent ozonization enables the reduction of the amount of sludge generated and the prevention of inappropriate sedimentation or the recovery of appropriate sedimentation to be achieved using a much smaller amount of ozone injected than the continuous ozonization.

Although the above example measures the concentration of polysaccharide in the activated-sludge floc, this embodiment is not limited to this aspect but similar effects can be obtained using any other index such as the concentration of protein or lipid in the sludge floc which relates to the extracellular organic substances in the sludge floc. Furthermore, multiple such indices may be combined.

Although the above example uses the automatic measuring device, this embodiment is not limited to this aspect but similar effects can be obtained by determining through manual analysis an index for the extracellular organic substances in the sludge floc and inputting the value obtained to the control section 12.

Although the above example varies the ozonization conditions depending on the index value such as the concentration of polysaccharide which concerns the extracellular organic substances in the floc, more effective operations can be performed by measuring an index such as SV concerning the sedimentation of the activated sludge, an organism decomposition activity index such as the respiratory activity, an incoming organic load index such as the concentration of TOC in the incoming waste water, or the concentration of dissolved oxygen in the activated-sludge-mixed liquid in the aeration vessel, together with the index such as the polysaccharide concentration which concerns the extracellular organic substances in the sludge floc and varying the amount of ozone injected, the circulated flow of sludge, the number of cycles, the cycle interval, and the amount of air supplied depending on these various measured values.

Embodiment 13

Figure 16:
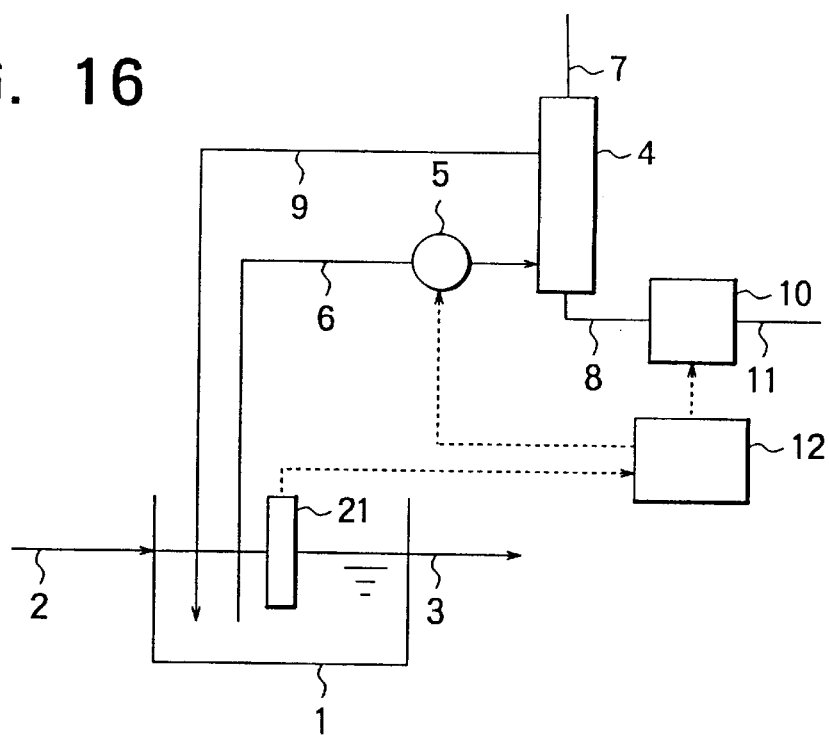
FIG. 16 is a flowchart describing the operation of a waste water treatment apparatus according to another embodiment of this invention.

Then, a waste water ozonization apparatus according to Embodiment 13 of this invention is described with reference to the drawings. FIG. 16 shows a flow for the waste water ozonization apparatus according to this invention. In this figure, 21 is a catalase activity measuring device for automatically measuring the catalase activity of activated-sludge microorganisms in the aeration vessel 1, and the other components are the same as in FIG. 10.

Next, the operation is explained. During the waste water treatment in the aeration vessel 1, the sludge drawing pump 5 is operated to circulate the sludge-mixed liquid in the aeration vessel 1 through the drawn-sludge channel 6, ozonization vessel 4, and ozonized-sludge channel 9. The ozonizer 10 generates ozone using as a material gas an oxygen gas or air supplied through the material gas supply channel 11, and the ozone is injected into the ozonization vessel 4 through the ozone supply channel 8 to ozonize the sludge. The ozone that has not been used for reaction with the sludge is discharged through the discharged-ozone channel 7. This series of operations are continuously preformed, and the control section 12 operates the sludge drawing pump 5 and the ozonizer 10 so as to provide a suitable amount of ozone injected and a suitable circulated flow of sludge for reducing the amount of sludge generated and preventing the sludge from sedimenting inappropriately or recovering appropriate sedimentation.

During the continuous ozonization, the catalase activity measuring device 21 measures the catalase activity of the activated-sludge microorganisms to input the result of the measurement to the control section 12. On receiving the input, the control section 12 sets the amount of ozone injected and the circulated flow of sludge based on this result and operates the sludge drawing pump 5 and the ozonizer 10 depending on these settings.

The activated-sludge microorganisms have an anti-oxidizing enzyme such as catalase which protects themselves from an external oxidant such as hydrogen petroxide or ozone. The activity of the anti-oxidization enzyme varies due to an external factor such as a qualitative change in the incoming waste water or a change in temperature or an internal factor of the activated-sludge microorganisms such as their multiplication phase. If the activity of the anti-oxidizing enzyme is excessively high, the strong resistance of the activated-sludge microorganisms to ozone precludes the microorganisms from being killed, solubilized, or made inorganic by ozone, thereby reducing the effects of the ozonization.

If an input signal from the catalase activity measuring device 21 is lower than or equal to a value preset based on a normal catalase activity, the control section 12 determines that the resistance of the activated-sludge microorganisms to oxidization is normal, and sets a suitable amount of ozone injected and a suitable circulated flow of sludge for reducing the amount of sludge generated and preventing the sludge from sedimenting inappropriately or recovering appropriate sedimentation in order to operate the sludge drawing pump 5 and the ozonizer 10 depending on these settings.

If an input signal from the catalase activity measuring device 21 is higher than the set value, the control section 12 determines that the anti-oxidizing capability of the activated-sludge microorganisms is excessively high, and sets conditions for enhancing the ozonization by increasing the amount of ozone injected and the circulated flow of sludge depending on the degree of the increase in the catalase activity in order to operate the sludge drawing pump 5 and the ozonizer 10 depending on these conditions.

By varying the amount of ozone injected and the circulated flow of sludge according to the value of the catalase activity of the activated-sludge microorganisms in the aeration vessel as described above, adequate ozonization can be provided depending on the resistance of the activated-sludge microorganisms to external oxidation in order to stably obtain effects in reducing the amount of sludge generated and preventing the sludge from sedimenting inappropriately or recovering appropriate sedimentation.

Although the above example executes the continuous ozonization of the sludge, this embodiment is not limited to this aspect but more efficient operations can be performed by the intermittent ozonization.

The operation of the intermittent ozonization is similar to that in Embodiment 7, and the control section 12 sets the amount of ozone injected per cycle, the number of cycles per day, and the cycle interval required for the intermittent ozonization, according to a measured value from the catalase activity measuring device 21, and operates the sludge drawing pump 5 and the ozonizer 10 depending on these settings.

By varying the amount of ozone injected per cycle, the number of cycles per day, and the cycle interval according to the value of the catalase activity of the activated-sludge microorganisms in the aeration vessel, adequate ozonization can be provided depending on the resistance of the activated-sludge microorganisms to external oxidation in order to stably obtain effects in reducing the amount of sludge generated and preventing the sludge from sedimenting inappropriately or recovering appropriate sedimentation. In addition, the intermittent ozonization enables the reduction of the amount of sludge generated and the prevention of inappropriate sedimentation or the recovery of appropriate sedimentation to be achieved using a much smaller amount of ozone injected than the continuous ozonization.

Although the above example measures the catalase activity of the activated-sludge microorganisms, this embodiment is not limited to this aspect but similar effects can be obtained using any other index such as the superoxidodismutase activity of the activated-sludge microorganisms which relates to the anti-oxidizing enzyme of the activated-sludge microorganisms that resists external oxidization. Furthermore, multiple such indices may be combined.

Although the above example uses the automatic measuring device, this embodiment is not limited to this aspect but similar effects can be obtained by determining through manual analysis an index for the anti-oxidizing enzyme of the activated-sludge microorganisms that resists external oxidization and inputting the value obtained to the control section 12.

Although the above example varies the ozonization conditions depending on the value of the anti-oxidizing enzyme activity of the activated-sludge microorganisms such as the catalase activity, more effective operations can be performed by measuring an index such as SV concerning the sedimentation of the sludge, an organic substance decomposition activity index such as the respiratory activity, an incoming organic load index such as the concentration of organic substances in the incoming waste water, an index for the extracellular organic substances in the sludge floc such as polysaccharide, or the concentration of dissolved oxygen in the activated-sludge-mixed liquid in the aeration vessel, together with the index for the anti-oxidizing enzyme activity of the activated-sludge microorganisms such as the catalase activity and varying the amount of ozone injected, the circulated flow of sludge, the number of cycles, the cycle interval, and the amount of air supplied depending on these various measured values.

Embodiment 14

Figure 17:
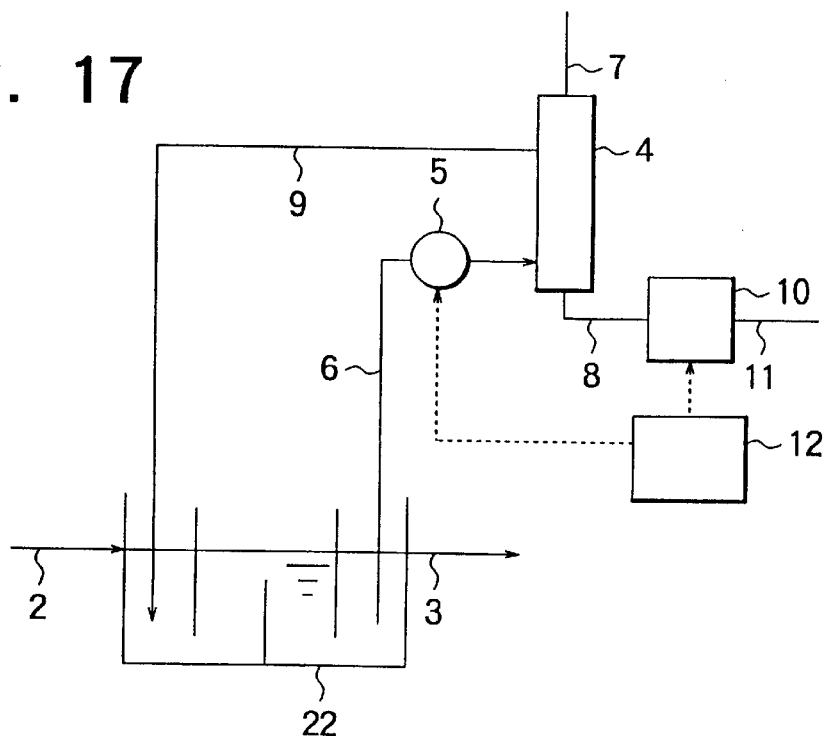
FIG. 17 is a flowchart describing the operation of a waste water treatment apparatus according to another embodiment of this invention.

Then, an ozonization apparatus according to Embodiment 14 of this invention is described with reference to the drawings. FIG. 17 shows a flow far the waste water ozonization apparatus according to this invention. In FIG. 17, 22 is an aeration vessel composed of four continuous sub-vessels, with the final sub-vessel of the aeration vessel 22 interconnected with the drawn-sludge channel 6 and the first sub-vessel of the aeration vessel 22 interconnected with the ozonized-sludge channel 9. The other components are the same as in FIG. 10.

Next, the operation of this embodiment is explained. During the waste water treatment in the aeration vessel 22, the control section 12 operates the sludge drawing pump 5 to introduce the sludge in the final sub-vessel of the aeration vessel 22 into the ozonization vessel 4 via the drawn-sludge channel 6 and then to return the sludge to the first sub-vessel of the aeration vessel 22 via the ozonized-sludge channel 9 in order to circulate the sludge in the aeration vessel 22. The ozonizer 10 generates ozone using as a material gas an oxygen gas or air supplied through the material gas supply channel 11, and the ozone is injected into the ozonization vessel 4 through the ozone supply channel 8 to ozonize the sludge. The ozone that has not been used for reaction with the sludge is discharged through the discharged-ozone channel 7. This series of operations are continuously preformed, and the control section 12 operates the sludge drawing pump 5 and the ozonizer 10 so as to provide a suitable amount of ozone injected and a suitable circulated flow of sludge for reducing the amount of sludge generated and preventing the sludge from sedimenting inappropriately or recovering appropriate sedimentation.

When the sludge is returned to the aeration vessel after ozonization, the organic load on the activated-sludge in the aeration vessel increases. If the aeration vessel consists of a single vessel and when sludge is drawn from the vessel for ozonization, the amount of activated sludge participating in the organic substances decomposition of the microorganisms in the aeration vessel decreases. Since the ozonized sludge is returned as a load to the aeration vessel where the amount of activated sludge has decreased, the organic load may significantly increase relative to the amount of activated sludge in the aeration vessel, thereby substantially degrading the quality of treated water. According to the present embodiment, however, sludge is drawn from the final sub-vessel of the aeration vessel 22 and ozonized sludge is returned to the first sub-vessel of the aeration vessel 22 that is different from the sub-vessel from which the sludge has been drawn. Since no sludge is drawn from the first sub-vessel and instead a normal amount of activated sludge is held therein, the organic load is prevented from excessively increasing due to the ozonized sludge, thereby reducing the possibility that the quality of treated water will be substantially degraded.

By separating the vessel from which sludge is drawn for ozonization from the vessel to which ozonized sludge is returned as described above, the organic load is prevented from substantially increasing relative to the amount of activated sludge in the aeration vessel to which the ozonized sludge has been returned in order to stably obtain effects in reducing the amount of sludge generated and preventing the sludge from sedimenting inappropriately or recovering appropriate sedimentation while avoiding the degradation of the quality of treated water caused by an excessive increase in load as well as the increase in the amount of aeration required.

Although the above example executes the continuous ozonization of the sludge, this embodiment is not limited to this aspect but more efficient operations can be performed by the intermittent ozonization.

The operation of the intermittent ozonization is similar to that in Embodiment 7, and the control section 12 sets the amount of ozone injected per cycle, the number of cycles per day, and the cycle interval, required for the intermittent ozonization, according to a measured value from the dissolved-oxygen concentration measuring device 19, and operates the sludge drawing pump 5, the ozonizer 10 depending on these settings.

By separating the vessel from which sludge is drawn for ozonization from the vessel to which ozonized sludge is returned, the organism load is prevented from substantially increasing relative to the amount of activated sludge in the aeration vessel to which the ozonized sludge has been returned in order to stably obtain effects in reducing the amount of sludge generated and preventing the sludge from sedimenting inappropriately or recovering appropriate sedimentation while avoiding the degradation of the quality of treated water caused by the excessive increase in load as well as the increase in the amount of aeration required. In addition, the intermittent ozonization enables the reduction of the amount of sludge generated and the prevention of inappropriate sedimentation or the recovery of appropriate sedimentation to be achieved using a much smaller amount of ozone injected than the continuous ozonization.

Although, in the above example, the aeration vessel is composed of four continuous sub-vessels, this embodiment is not limited to this aspect but similar effects can be obtained using an aeration vessel composed of at least two or more continuous sub-vessels.

Although the above example draws sludge from the final sub-vessel of the aeration vessel consisting of multiple vessels and returns ozonized sludge to the first vessel, this embodiment is not limited to this aspect but similar effects can be obtained by drawing sludge from one of the sub-vessels constituting the single aeration vessel and returning ozonized sludge to another vessel different from the sub-vessel from which the sludge has been removed.

Although the above example uses the aeration vessel composed of the multiple sub-vessels, similar effects can be obtained by partitioning the aeration vessel consisting of a single vessel, into a sub-vessel from which sludge is drawn for ozonization and a sub-vessel to which ozonized sludge is returned.

In addition, in the above example, more effective operations can be performed by measuring an index such as SV concerning the sedimentation of the activated sludge, an organic substance decomposition activity index such as the respiratory activity, an incoming organic load index such as the concentration of organic substances in the incoming waste water, an index such as the concentration of polysaccharide which relates to the extracellular organic substances in the sludge floc, an index such as the catalase activity which concerns the anti-oxidizing enzyme activity of the activated-sludge microorganisms, and/or the concentration of dissolved oxygen in the activated-sludge-mixed liquid in the aeration vessel and varying the amount of ozone injected, the circulated flow of sludge, the number of cycles, the cycle interval, and the amount of air supplied depending on these various measured values.

Embodiment 15

Figure 18:
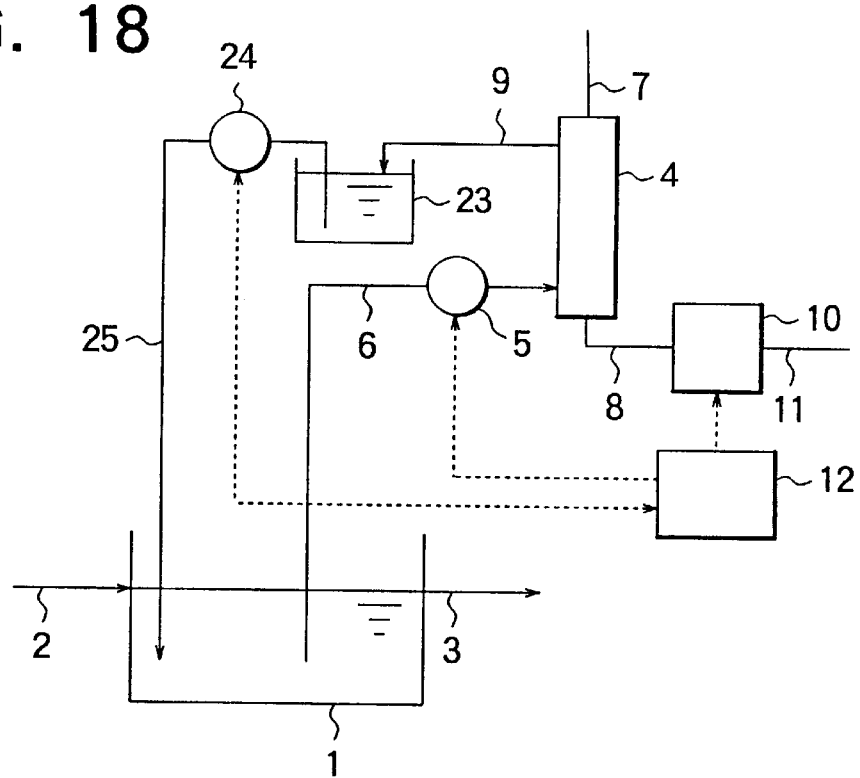
FIG. 18 is a flowchart describing the operation of a waste water treatment apparatus according to another embodiment of this invention.

Then, a waste water ozonization apparatus according to Embodiment 15 of this invention is described with reference to the drawings. FIG. 18 shows a flow for the ozonization apparatus of this invention. In this figure, 23 is an ozonized-sludge storage vessel that stores ozonized sludge and that is interconnected with the ozonized-sludge channel 9 interconnected with the ozone reaction vessel 4, the ozonized-sludge vessel also being interconnected with a stored-sludge channel 25 including a stored-sludge returning pump 24 in its middle. The other components are the same as in FIG. 10.

Next, the operation is explained. During the waste water treatment in the aeration vessel 1, the control section 12 operates the sludge drawing pump 5 to introduce the sludge in the aeration vessel 1 into the ozonization vessel 4 via the drawn-sludge channel 6.

The ozonizer 10 generates ozone using as a material gas an oxygen gas or air supplied through the material gas supply channel 11, and the ozone is injected into the ozonization vessel 4 through the ozone supply channel 8 to ozonize the sludge. In the ozone reaction vessel 4, the ozone is contacted with the sludge circulated by the sludge drawing pump 5 to react the sludge and ozone together. The ozone that has not been used for reaction with the sludge is discharged through the discharged-ozone channel 7. The ozonized sludge is introduced into the ozonized-sludge storage vessel 23 via the ozonized-sludge channel 9 for storage.

After a specified period of time, the ozonizer 10 stops generating ozone, and stops the sludge drawing pump 5 after the sludge in the ozonization vessel 4 has been sufficiently replaced for the sludge in the aeration vessel 1. Subsequently, before the next ozonization is started, the stored-sludge returning pump 24 is operated to return the ozonized sludge to the aeration vessel 1 through the stored-sludge channel 25.

This series of operations constitute one cycle of ozonization, and the control section 12 operates the sludge drawing pump 5 and the ozonizer 10 so as to provide a suitable amount of ozone injected per cycle, a suitable number of cycles per day, and a suitable cycle interval for reducing the amount of sludge generated and preventing the sludge from sedimenting inappropriately or recovering appropriate sedimentation.

If ozone is injected while the activated sludge is being circulated between the aeration vessel 1 and the ozone reaction vessel 4, the ozonized sludge returns to the aeration vessel at the circulated flow of the activated sludge. Consequently, if the circulated flow of sludge is high, a large amount of ozonized sludge returns to the aeration vessel in a short period of time to rapidly increase the organic load on the activated sludge in the aeration vessel, thereby noticeably degrading the quality of treated water. According to the present embodiment, however, the ozonized sludge is stored in the ozonized-sludge storage vessel 23 and returned to the aeration vessel while ozonization is not carried out. As a result, by using a sludge storage vessel with a volume sufficient to reserve ozonized sludge and operating the stored-sludge returning pump 24 at a low flow, the ozonized sludge can be returned to the aeration vessel while precluding the organic load from temporarily increasing.

By allowing a certain period of time to pass before returning the ozonized sludge to the aeration vessel, the organic load on the activated sludge in the aeration vessel can be prevented from increasing rapidly in order to stably obtain effects in reducing the amount of sludge generated and preventing the sludge from sedimenting inappropriately or recovering appropriate sedimentation.

Although the above example stops the stored-sludge returning pump 24 while ozone is being injected, this embodiment is not limited to this aspect but similar effects can be obtained by operating the stored-sludge returning pump 24 during ozonization.

Although the above embodiment installs the ozonized-sludge storage vessel and the ozonized sludge is then stored in this vessel, this embodiment is not limited to this aspect but similar effects can be obtained by installing before the aeration vessel a regulating vessel that regulates the flow of waste water and introducing the ozonized sludge into the regulating vessel.

Although the above example does not install a device for stirring the inside of the ozonized-sludge storage vessel 23, this embodiment is not limited to this aspect but if the ozonized sludge is not uniformly returned to the aeration vessel 1 due to the precipitation of the ozonized sludge in the ozonized-sludge storage vessel 23, a rotary stirrer may be installed that stirs the inside of the ozonized-sludge storage vessel 23.

Although the above example ozonizes the activated sludge in the aeration vessel consisting of a single vessel, this embodiment is not limited to this aspect but similar effects can be obtained when the activated sludge in an aeration vessel composed of multiple sub-vessels is ozonized. In this case, by separating the vessel from which sludge is drawn from the vessel to which ozonized sludge is returned, the possibility that the quality of treated water will be degraded can be further reduced.

In addition, in the above example, more effective operations can be performed by measuring an index such as SV concerning the sedimentation of the activated sludge, an organic substance decomposition activity index such as the respiratory activity, an incoming organic load index such as the concentration of organic substances in the incoming waste water, an index such as the concentration of polysaccharide which relates to the extracellular organic substances in the sludge floc, an index such as the catalase activity which concerns the anti-oxidizing enzyme activity of the activated-sludge microorganisms, or the concentration of dissolved oxygen in the activated-sludge-mixed liquid in the aeration vessel and varying the amount of ozone injected, the circulated flow of sludge, the number of cycles, the cycle interval, and the amount of air supplied depending on these various measured values.

Embodiment 16

Figure 19:
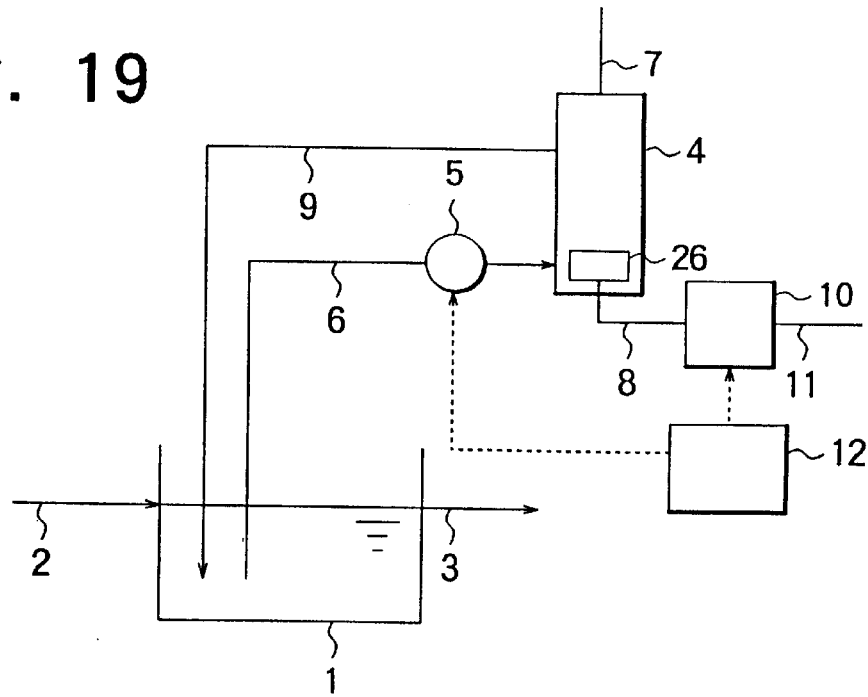
FIG. 19 is a flowchart describing the operation of a waste water treatment apparatus according to another embodiment of this invention.

Then, a waste water ozonization apparatus according to Embodiment 16 of this invention is described with reference to the drawings. FIG. 19 shows a flow for the waste water ozonization apparatus according to this invention. In this figure, 26 is an ozone diffuser interconnected with the ozone supply channel 8 and installed in the ozone reaction vessel 4. The other components are the same as in FIG. 10.

Next, the operation is explained. During the waste water treatment in the aeration vessel 1, the sludge drawing pump 5 is operated to circulate the sludge-mixed liquid in the aeration vessel 1 through the drawn-sludge channel 6, ozonization vessel 4, and ozonized-sludge channel 9. The ozonizer 10 generates ozone using as a material gas an oxygen gas or air supplied through the material gas supply channel 11, and the ozone is injected into the activated sludge in the ozonization vessel 4 through the ozone supply channel 8 and the ozone diffuser 26 installed in the ozonization vessel 4. The ozone that has not been used for reaction with the sludge is discharged through the discharged-ozone channel 7. This series of operations are continuously performed, and the control section 12 operates the sludge drawing pump 5 and the ozonizer 10 so as to provide a suitable amount of ozone injected and a suitable circulated flow of sludge for reducing the amount of sludge generated and preventing the sludge from sedimenting inappropriately or recovering appropriate sedimentation.

The ozone diffuser 26 has a large number of fine holes therein, and when transmitted through the holes, ozone becomes fine bubbles of 1 to 5 mm size, thereby increasing the ozone dissolution efficiency and noticeably increasing the area of the ozone that contacts the activated sludge. Thus, the efficiency with which the ozone contacts and reacts with the activated sludge increases to enable efficient ozone injection in order to efficiently obtain effects in reducing the amount of sludge generated and preventing the sludge from sedimenting inappropriately or recovering appropriate sedimentation.

Although the above example executes the continuous ozonization of the sludge, this embodiment is not limited to this aspect but more efficient operations can be performed by the intermittent ozonization.

The operation of the intermittent ozonization is similar to that in Embodiment 7, and the use of the diffuser increases the efficiency with which ozone contacts and reacts with activated sludge to enable efficient ozone injection in order to efficiently obtain effects in reducing the amount of sludge generated and preventing the sludge from sedimenting inappropriately or recovering appropriate sedimentation.

In addition, the intermittent ozonization enables the reduction of the amount of sludge generated and the prevention of inappropriate sedimentation or the recovery of appropriate sedimentation to be achieved using a much smaller amount of ozone injected than the continuous ozonization.

Although the above example ozonizes the activated sludge in the aeration vessel consisting of a single vessel, this embodiment is not limited to this aspect but similar effects can be obtained when the activated sludge in an aeration vessel composed of multiple sub-vessels is ozonized. In this case, by separating the vessel from which sludge is drawn from the vessel to which ozonized sludge is returned, the possibility that the quality of treated water will be degraded can be further reduced.

In addition, although the above example uses an ozone injector such as the ozone diffuser to efficiently inject ozone, more efficient and stable operations can be performed by combining this ozone injector such as the ozone diffuser with a device for temporarily storing the ozonized sludge.

In addition, in the above example, more effective operations can be performed by measuring an index such as SV concerning the sedimentation of the activated sludge, an organic substance decomposition activity index such as the respiratory activity, an incoming organic load index such as the concentration of organic substances in the incoming waste water, an index such as the concentration of polysaccharide which relates to the extracellular organic substances in the sludge floc, an index such as the catalase activity which concerns the anti-oxidizing enzyme activity of the activated-sludge microorganisms, or the concentration of dissolved oxygen in the activated-sludge-mixed liquid in the aeration vessel and varying the amount of ozone injected, the circulated flow of sludge, the number of cycles, the cycle interval, and the amount of air supplied depending on these various measured values.

Embodiment 17

Figure 20:
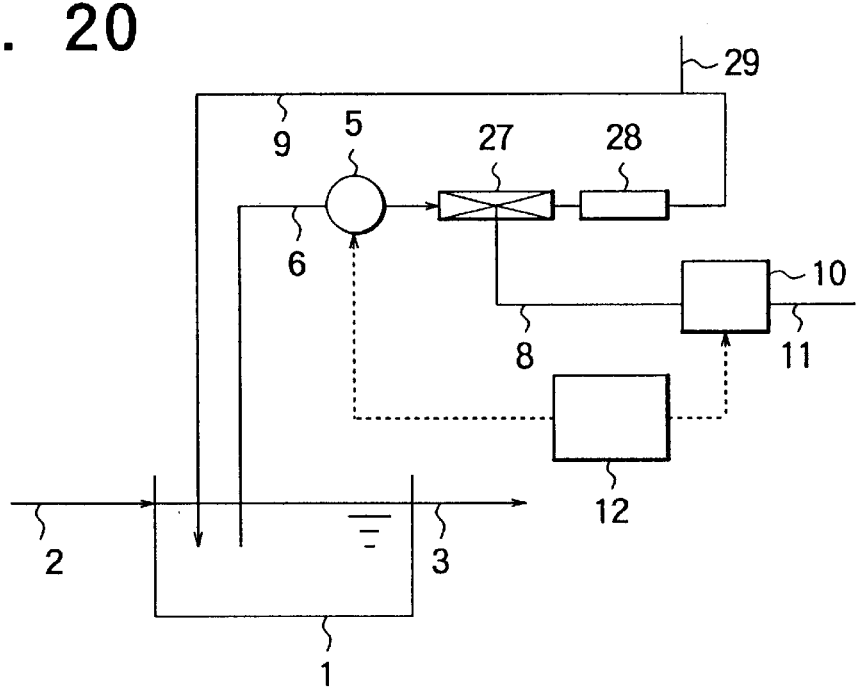
FIG. 20 is a flowchart describing the operation of a waste water treatment apparatus according to another embodiment of this invention.

Then, a waste water ozonization apparatus according to Embodiment 17 of this invention is described with reference to the drawings. FIG. 20 shows a flow for the ozonization apparatus of this invention. In this figure, 27 is an ejector interconnected with the ozone supply channel 8 and the sludge drawing channel 6 including the sludge drawing pump 5 in its middle. A line mixer 28 having a spirally shaped structure in a pipe in its longitudinal direction is disposed after the ejector and is connected to the ozonized sludge channel 9. Reference numeral 29 designates a discharged-ozone channel that discharges ozone that has not been used for reaction in the line mixer 28. The other components are the same as in FIG. 10.

Next, the operation is explained. During the waste water treatment in the aeration vessel 1, the sludge drawing pump 5 is operated to introduce the sludge-mixed liquid in the aeration vessel 1 into the ejector 27 via the sludge drawing passage 6. The ozonizer 10 generates ozone using as a material gas an oxygen gas or air supplied through the material gas supply channel 11, and the ozone is introduced into the ejector 27 through the ozone supply channel 8 in order to inject ozone into the activated sludge. The injected ozone and the activated sludge are passed through the line mixer 28 so as to be mixed and contacted together. While the ozone that has not been used for reaction with the sludge is discharged through the discharged-ozone channel 29, the ozonized sludge is returned to the aeration vessel 1 through the ozonized-sludge channel 9. This series of operations are continuously preformed, and the control section 12 operates the sludge drawing pump 5 and the ozonizer 10 so as to provide a suitable amount of ozone injected and a suitable circulated flow of sludge for reducing the amount of sludge generated and preventing the sludge from sedimenting inappropriately or recovering appropriate sedimentation.

Using the ejector 27 to inject ozone significantly increases the concentration of ozone dissolved into the sludge-mixed liquid and thus the ozone dissolution efficiency. In addition, the use of the line mixer 28 can increase the efficiency with which sludge contacts and reacts with ozone. Accordingly, the amount of sludge generated can be reduced using a small amount of ozone. In addition, the dissolution and reaction efficiency can be further improved by connecting a plurality of ejectors 27 and line mixers 28 to the apparatus. Due to the small size of the ejector 27 and line mixer 28, the apparatus can be miniaturized.

Although the above example exhausts discharged ozone from the discharged-ozone channel 18 provided in the sludge drawing channel 6, the ozone remaining in the liquid may adversely affect the organic substances decomposition of the activated sludge in the aeration vessel. If the ozone remaining in the sludge-mixed liquid degrades the quality of treated water, this problem can be avoided by passing the sludge-mixed liquid containing ozone through a gas-liquid separation vessel provided after the line mixer 28 in order to fully remove the remaining ozone.

Although the above example executes the continuous ozonization of the sludge, this embodiment is not limited to this aspect but more efficient operations can be performed by the intermittent ozonization.

The operation of the intermittent ozonization is similar to that in Embodiment 7, and the circulation of activated sludge-mixed liquid and the injection of ozone are performed intermittently. The control section 12 sets the amount of ozone injected per cycle, the number of cycles per day, and the cycle interval required for the intermittent ozonization, suitable for reducing the amount of sludge generated and preventing the sludge from sedimenting in appropriately or receiving appropriate sedimentation and operates the sludge drawing pump 5 and the ozonizer 10 depending on these settings. The use of the ejector and the line mixer can increase the efficiency with which ozone is dissolved and reacts with activated sludge, thereby reducing the ozone dose required. In addition, the intermittent ozonization enables the reduction of the amount of sludge generated and the prevention of inappropriate sedimentation or the recovery of appropriate sedimentation to be achieved using a much smaller amount of ozone injected than the continuous ozonization.

Although the above example uses the ejector and the line mixer, this embodiment is not limited to this aspect but similar effects can be obtained using an injector capable of efficiently injecting ozone or a mixer that efficiently stirs and mixes activated sludge and ozone together.

Although the above example ozonizes the activated sludge in the aeration vessel consisting of a single vessel, this embodiment is not limited to this aspect but similar effects can be obtained when the activated sludge in an aeration vessel composed of multiple sub-vessels is ozonized. In this case, by separating the vessel from which sludge is drawn from the vessel to which ozonized sludge is returned, the possibility that the quality of treated water will be degraded can be further reduced.

In addition, although the above example uses an ozone injector such as the ejector or a mixer such as the line mixer to improve the efficiency with which ozone is dissolved and reacts with activated sludge, more efficient and stable operations can be performed by combining this ozone injector or mixer with a device for temporarily storing ozonized sludge.

In addition, in the above example, more effective operations can be performed by measuring an index such as SV concerning the sedimentation of the activated sludge, an organic substances decomposition activity index such as the respiratory activity, an incoming organic load index such as the concentration of organic substances in the incoming waste water, an index such as the concentration of polysaccharide which relates to the extracellular organic substances in the sludge floc, an index such as the catalase activity which concerns the anti-oxidizing enzyme activity of the activated-sludge microorganisms, and/or the concentration of dissolved oxygen in the activated-sludge-mixed liquid in the aeration vessel and varying the amount of ozone injected, the circulated flow of sludge, the number of cycles, the cycle interval, and the amount of air supplied depending on these various measured values.

Embodiment 18

Figure 21:
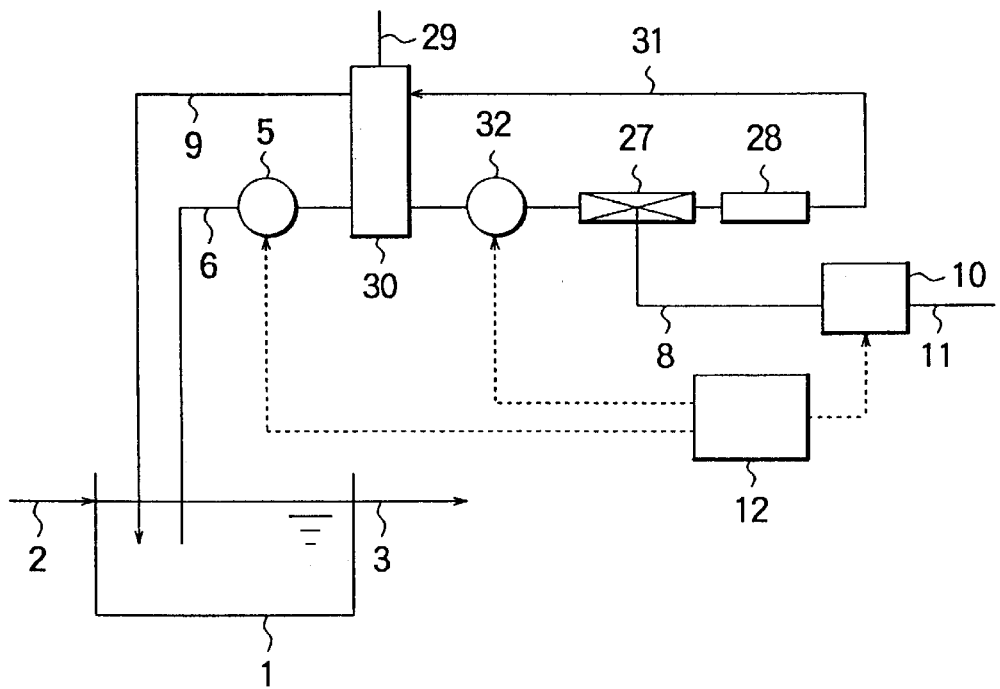
FIG. 21 is a flowchart describing the operation of a waste water treatment apparatus according to another embodiment of this invention.

Then, a waste water ozonization apparatus according to Embodiment 18 of this invention is described with reference to the drawings. FIG. 21 shows a flow for the ozonization apparatus of waste water of this invention. In this figure, 30 is a sludge circulation vessel that circulates the activated sludge in the aeration vessel and that is interconnected with the sludge drawing channel 6 including the sludge drawing pump 5 in its middle; the ozonized-sludge channel 9; and the discharged-ozone channel 29 for discharging ozone that has not been used for reaction. Reference numeral 31 denotes a sludge circulating channel that circulates the activated sludge in the sludge circulating vessel 30 and that has a sludge circulating pump 32, the ejector 27, and the line mixer 28 in its middle. The ejector 27 is interconnected with the ozone supply channel 8. The other components are the same as in FIG. 10.

Next, the operation is explained. During the waste water treatment in the aeration vessel 1, the sludge drawing pump 5 is operated to circulate the sludge in the aeration vessel 1 through the sludge drawing channel 6, the sludge circulating vessel 30, and the ozonized-sludge channel 9.

At the same time, the sludge circulating pump 32 is operated to introduce the sludge in the sludge circulating vessel 30 into the ejector 27 via the sludge circulating channel 31. The ozonizer 10 generates ozone using as a material gas an oxygen gas or air supplied through the material gas supply channel 11, and the ozone is injected into the ejector 27 through the ozone supply channel 8. The injected ozone and the activated sludge are passed through the line mixer 28 so as to be mixed and contacted together.

The ozonized sludge is returned to the sludge circulating vessel 30 through the sludge circulating channel 31. The ozone that has not been used for reaction with the sludge is discharged through the discharged-ozone channel 29 interconnected with the sludge circulating vessel 30. This series of operations are continuously preformed, and the control section 12 operates the sludge drawing pump 5, the sludge circulating pump 32, and the ozonizer 10 so as to provide a suitable amount of ozone injected, a suitable circulated flow of sludge, and a suitable flow of sludge through the sludge circulating channel for reducing the amount of sludge generated and preventing the sludge from sedimenting inappropriately or recovering appropriate sedimentation.

Using the ejector 27 to inject ozone increases the ozone dissolution efficiency. In addition, the use of the line mixer 28 can increase the efficiency with which sludge reacts with ozone. Furthermore, since the activated sludge in the aeration vessel 1 is received by the sludge circulating vessel 30 and is circulated while ozone is simultaneously injected, the ozonization can be repeated in the ejector 27 to improve the controllability and to further improve the efficiency with which the ozone is dissolved and reacts with the activated sludge, thereby enabling the amount of sludge generated to be reduced using a small ozone dose. In addition, the dissolution and reaction efficiency can be further improved by connecting a plurality of ejectors 27 and line mixers 28 to the apparatus. In addition, due to the provision of the discharged-ozone channel 29, the sludge circulating vessel 30 also acts as a gas-liquid separation vessel used to remove the ozone that remains in the sludge-mixed liquid after ozonization and that may adversely affect the organic substances decomposition of the activated sludge in the aeration vessel.

Although the above example executes the continuous ozonization of the sludge, this embodiment is not limited to this aspect but more efficient operations can be performed by the intermittent ozonization.

The operation of the intermittent ozonization is similar to that in Embodiment 7, and the circulation of the activated-sludge-mixed liquid and the injection of ozone are intermittently carried out. The control section 12 sets the amount of ozone injected per cycle, the number of cycles per day, and the cycle interval that are required for the intermittent ozonization and that are also suited for reducing the amount of sludge generated and preventing the sludge from sedimenting inappropriately or recovering appropriate sedimentation. The control section 12 then operates the sludge drawing pump 5, the sludge generating pump 32, and the ozonizer 10 depending on these settings.

The use of the ejector and the line mixer can increase the efficiency with which ozone is dissolved and reacts with activated sludge, thereby reducing the ozone dose required. In addition, the use of the sludge circulating vessel 30 enables the ozonization to be repeated in the ejector to improve the controllability and to further improve the efficiency with which the ozone is dissolved and reacts with the activated sludge, thereby enabling the amount of sludge generated to be reduced using a small ozone dose. In addition, the intermittent ozonization enables the reduction of the amount of sludge generated and the prevention of inappropriate sedimentation or the recovery of appropriate sedimentation to be achieved using a much smaller amount of ozone injected than the continuous ozonization.

Although the above example uses the ejector and the line mixer, this embodiment is not limited to this aspect but similar effects can be obtained using an injector capable of efficiently injecting ozone or a mixer that efficiently stirs and mixes activated sludge and ozone together.

Although the above example ozonizes the activated sludge in the aeration vessel consisting of a single vessel, this embodiment is not limited to this aspect but similar effects can be obtained when the activated sludge in an aeration vessel composed of multiple sub-vessels is ozonized. In this case, by separating the vessel from which sludge is drawn from the vessel to which ozonized sludge is returned, the possibility that the quality of treated water will be degraded can be further reduced.

In addition, although the above example uses an ozone injector such as the ejector or a mixer such as the line mixer to improve the efficiency with which ozone is dissolved and reacts with activated sludge, more efficient and stable operations can be performed by combining this ozone injector or mixer with a device for temporarily storing ozonized sludge.

In addition, in the above example, more effective operations can be performed by measuring an index such as SV concerning the sedimentation of the activated sludge, an organic substance decomposition activity index such as the respiratory activity, an incoming organic load index such as the concentration of organic substances in the incoming waste water, an index such as the concentration of polysaccharide which relates to the extracellular organic substances in the sludge floc, an index such as the catalase activity which concerns the anti-oxidizing enzyme activity of the activated-sludge microorganisms, and/or the concentration of dissolved oxygen in the activated-sludge-mixed liquid in the aeration vessel and varying the amount of ozone injected, the circulated flow of sludge, the number of cycles, the cycle interval, and the amount of air supplied depending on these various measured values in the control section 12.

Embodiment 19

Figure 22:
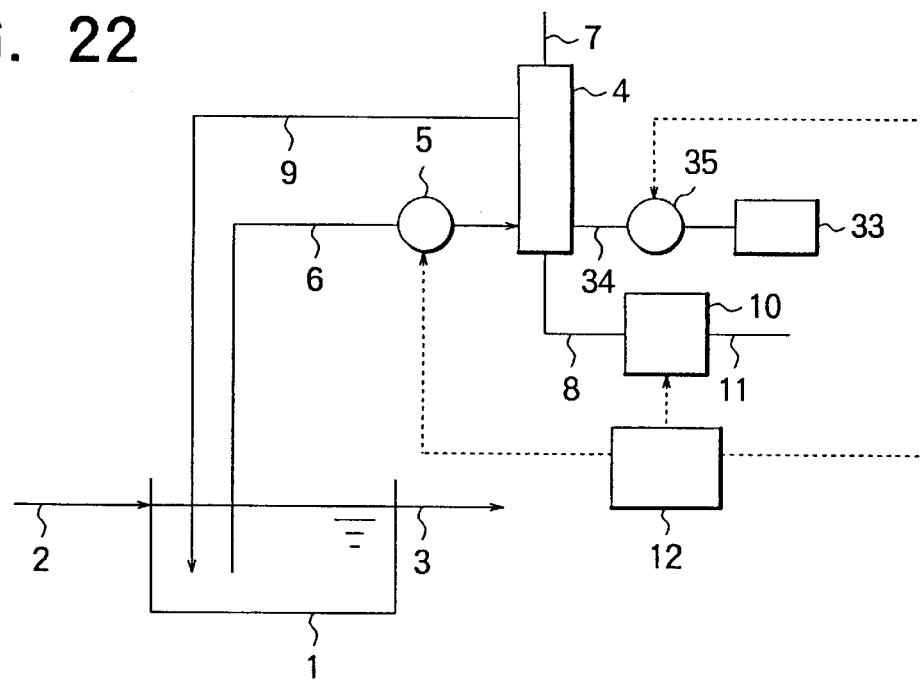
FIG. 22 is a flowchart describing the operation of a waste water treatment apparatus according to another embodiment of this invention.

Then, a waste water ozonization apparatus according to Embodiment 19 of this invention is described with reference to the drawings. FIG. 22 shows a flow for the ozonization apparatus of this invention. In this figure, 33 is a hydrogen peroxide storage vessel that stores hydrogen peroxide, and 34 is a hydrogen peroxide supply channel including a hydrogen peroxide supply pump 35 in its middle and supplying hydrogen peroxide to the neighborhood of an ozone injection section in the ozone reaction vessel 4. The control section 12 controls the operation of the hydrogen peroxide supply pump 35 as well as the sludge drawing pump 5 and the ozonizer 10. The other components are the same as in FIG. 10.

Next, the operation is explained. During the waste water treatment in the aeration vessel 1, the sludge drawing pump 5 is operated to circulate the sludge in the aeration vessel 1 through the sludge drawing channel 6, the ozonization vessel 4, and the ozonized-sludge channel 9.

The ozonizer 10 generates ozone using as a material gas an oxygen gas or air supplied through the material gas supply channel 11, and the ozone is injected into the ozonization vessel 4 through the ozone supply channel 8. At the same time, the hydrogen peroxide supply pump 34 is operated to supply hydrogen peroxide to the periphery of the ozone injection section in the ozone reaction vessel 4 in order to react the ozone with the hydrogen peroxide to generate a reactive active species such as an OH radical. In the ozone reaction vessel 4, the activated sludge circulated by the sludge drawing pump 5 is contacted with the ozone and the active species generated by the reaction between the ozone and hydrogen peroxide. The ozone that has not been used for reaction with the sludge is discharged through the discharged-ozone channel 7. This series of operations are continuously preformed, and the control section 12 operates the sludge drawing pump 5, the hydrogen peroxide supply pump 35, and the ozonizer 10 so as to provide a suitable amount of ozone injected and a suitable circulated flow of sludge for reducing the amount of sludge generated and preventing the sludge from sedimenting inappropriately or recovering appropriate sedimentation.

Since the active species generated by the reaction between the ozone and hydrogen peroxide provides stronger oxidization than ozone, the active species and the activated sludge can be reacted together to facilitate the killing, solubilization, or making-inorganic of the activated-sludge microorganisms compared to ozone.

Since the reaction of the activated sludge is facilitated by using the active species capable of strong oxidation to treat the activated sludge as described above, the amount of ozone injected and the amount of sludge treated can be reduced to stably obtain, despite low operation costs, effects in reducing the amount of sludge generated and preventing the sludge from sedimenting inappropriately or recovering appropriate sedimentation while avoiding the degradation of the quality of treated water and the increase of the amount of aeration required which are caused by an increase in load.

Although the above example executes the continuous ozonization of the sludge, this embodiment is not limited to this aspect but more efficient operations can be performed by the intermittent ozonization.

The operation of the intermittent ozonization is similar to that of Embodiment 7, and the circulation of the activated-sludge-mixed liquid, and the injection of ozone and hydrogen peroxide are intermittently carried out. The control section 12 sets the amount of ozone injected per cycle, the number of cycles per day, and the cycle interval that are required for the intermittent ozonization and that are also suited for reducing the amount of sludge generated and preventing the sludge from sedimenting inappropriately or recovering appropriate sedimentation. The control section 12 then operates the sludge drawing pump 5, the hydrogen peroxide supply pump 35, and the ozonizer 10 depending on these settings.

Since the reaction of the activated sludge is facilitated by using the active species capable of strong oxidation to treat the activated sludge as described above, the amount of ozone injected and the amount of sludge treated can be reduced to stably obtain effects in reducing the amount of sludge generated and preventing the sludge from sedimenting inappropriately or recovering appropriate sedimentation while using low operation costs to avoid the degradation of the quality of treated water caused by an increase in load as well as the increase in the amount of aeration required. In addition, the intermittent ozonization enables the reduction of the amount of sludge generated and the prevention of inappropriate sedimentation or the recovery of appropriate sedimentation to be achieved using a much smaller amount of ozone injected than the continuous ozonization.

Although the above example ozonizes the activated sludge in the aeration vessel consisting of a single vessel, this embodiment is not limited to this aspect but similar effects can be obtained when the activated sludge in an aeration vessel composed of multiple sub-vessels is ozonized. In this case, by separating the vessel from which sludge is drawn from the vessel to which ozonized sludge is returned, the possibility that the quality of treated water will be degraded can be further reduced.

Although the above example uses the device for adding hydrogen peroxide to generate the reactive active species, more efficient and stable operations can be performed by combining this device with a device such as an ozone storage vessel which temporarily stores ozonized sludge, an ozone injector such as an ozone diffuser which inject ozone as bubbles, an ozone injector such as an ejector, or a mixer such as a line mixer.

In addition, in the above example, more effective operations can be performed by measuring an index such as SV concerning the sedimentation of the activated sludge, an organic substances decomposition activity index such as the respiratory activity, an incoming organic load index such as the concentration of organic substances in the incoming waste water, an index such as the concentration of polysaccharide which relates to the extracellular organic substances in the sludge floc, an index such as the catalase activity which concerns the anti-oxidizing enzyme activity of the activated-sludge microorganisms, and/or the concentration of dissolved oxygen in the activated-sludge-mixed liquid in the aeration vessel and varying the amount of ozone injected, the circulated flow of sludge, the number of cycles, the cycle interval, and the amount of air supplied depending on these various measured values in the control section 12.

Embodiment 20

Figure 23:
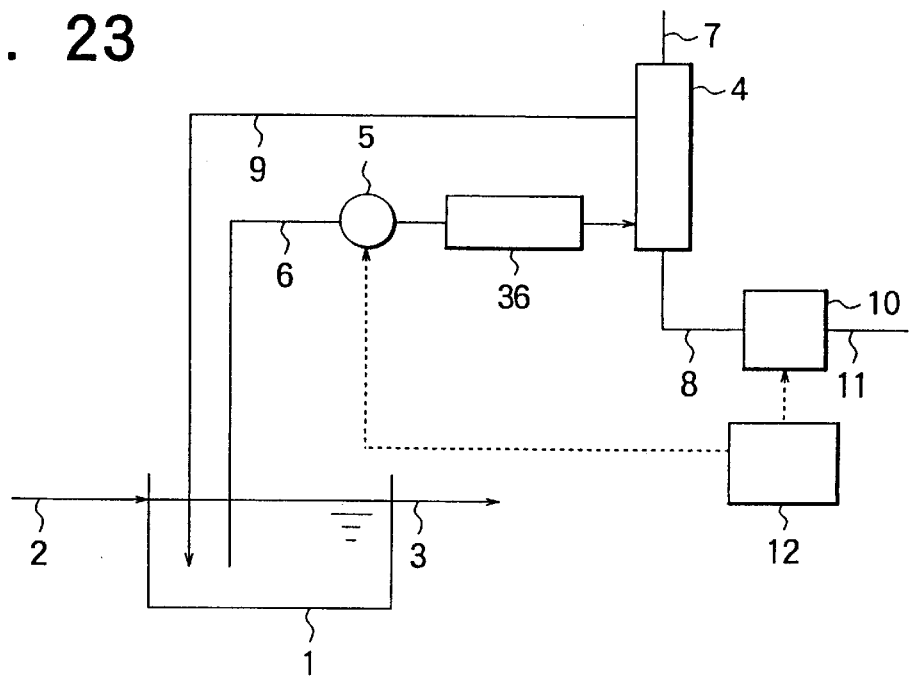
FIG. 23 is a flowchart describing the operation of a waste water treatment apparatus according to another embodiment of this invention.

Then, a waste water ozonization apparatus according to Embodiment 20 of this invention is described with reference to the drawings. FIG. 23 shows a flow for the waste water ozonization apparatus according to this invention. In this figure, 36 is a line mixer installed in the middle of the sludge drawing channel 6, and the other components are the same as in FIG. 10.

Next, the operation is explained. During the waste water treatment in the aeration vessel 1, the sludge drawing pump 5 is operated by the control section 12 to introduce the sludge in the aeration vessel 1 into the ozonization vessel 4 via the sludge drawing channel 6 and the line mixer 36 and then to return the sludge to the aeration vessel 1 through the ozonized-sludge channel 9 in order to circulate the sludge in the vessel 1. The ozonizer 10 generates ozone using as a material gas an oxygen gas or air supplied through the material gas supply channel 11, and the ozone is injected into the ozonization vessel 4 through the ozone supply channel 8 in order to ozonize the sludge. The ozone that has not been used for reaction with the sludge is discharged through the discharged-ozone channel 7. This series of operations are continuously preformed, and the control section 12 operates the sludge drawing pump 5 and the ozonizer 10 so as to provide a suitable amount of ozone injected and a suitable circulated flow of sludge for reducing the amount of sludge remaining and preventing the sludge from sedimenting inappropriately or recovering appropriate sedimentation.

The activated sludge normally forms a floc that is an aggregate of microorganisms or extracellular organisms. If ozone is injected into sludge that allows the floc to be formed with high condensability, ozone reacts with high condensability with the microorganisms on the surface of the floc, whereas it cannot react with the microorganisms present inside the floc unless it can penetrate the activated-sludge floc. As a result, the reaction does not progress smoothly. According to this embodiment, however, the line mixer is installed before the ozone injection, so the activated sludge from the aeration vessel can be fully stirred to destroy the activated-sludge floc in order to disperse the activated-sludge microorganisms. When ozone is injected into the sludge in which the activated-sludge microorganisms are dispersed, the reaction between the ozone and microorganisms is facilitated to improve the effects of the injected ozone.

By dispersing the activated-sludge floc before injecting ozone as described above, the reactivity between the activated-sludge microorganisms and the injected ozone is improved to reduce the amount of ozone injected and the amount of sludge treated. Thus, despite the needs for low operation costs, this embodiment can stably obtain effects in reducing the amount of sludge generated and preventing the sludge from sedimenting inappropriately or recovering appropriate sedimentation while avoiding the degradation of the quality of treated water and the increase of the amount of aeration required which are caused by an increase in load.

Although the above example uses the line mixer, this embodiment is not limited to this aspect but similar effects can be obtained using any other device such as a supersonic crusher or a homogenizer which can disperse the activated-sludge floc. Furthermore, multiple such devices can be combined together.

Although the above example executes the continuous ozonization of the sludge, this embodiment is not limited to this aspect but more efficient operations can be performed by the intermittent ozonization.

The operation of the intermittent ozonization is similar to that of Embodiment 7, and the circulation of the activated-sludge-mixed liquid and the injection of ozone are intermittently executed. The control section 12 sets the amount of ozone injected per cycle, the number of cycles per day, and the cycle interval that are required for the intermittent ozonization and that are also suited for reducing the amount of sludge generated and preventing the sludge from sedimenting inappropriately or recovering appropriate sedimentation. The control section 12 then operates the sludge drawing pump 5 and the ozonizer 10 depending on these settings.

By dispersing the activated-sludge floc before injecting ozone, the reactivity between the activated-sludge microorganisms and the injected ozone is improved to reduce the amount of ozone injected and the amount of sludge treated. Thus, despite the needs for low operation costs, this embodiment can stably obtain effects in reducing the amount of sludge generated and preventing the sludge from sedimenting inappropriately or recovering appropriate sedimentation while avoiding the degradation of the quality of treated water and the increase of the amount of aeration required which are caused by an increase in load. In addition, the intermittent ozonization enables the reduction of the amount of sludge generated and the prevention of inappropriate sedimentation or the recovery of appropriate sedimentation to be achieved using a much smaller amount of ozone injected than that of the continuous ozonization.

Although the above example ozonizes the activated sludge in the aeration vessel consisting of a single vessel, this embodiment is not limited to this aspect but similar effects can be obtained when the activated sludge in an aeration vessel composed of multiple sub-vessels is ozonized. In this case, by separating the vessel from which sludge is drawn from the vessel to which ozonized sludge is returned, the possibility that the quality of treated water will be degraded can be further reduced.

Although the above example uses a device such as the line mixer which crushes an activated-sludge floc, more efficient and stable operations can be performed by combining this device with a device such as an ozone storage vessel which temporarily stores ozonized sludge, an ozone injector such as an ozone diffuser which inject ozone as bubbles, an ozone injector such as an ejector, a mixer such as a line mixer, or a device for adding hydrogen peroxide.

In addition, in the above example, more effective operations can be performed by measuring an index such as SV concerning the sedimentation of the activated sludge, an organic substance decomposition activity index such as the respiratory activity, an incoming organism load index such as the concentration of organisms in the incoming waste water, an index such as the concentration of polysaccharide which relates to the extracellular organic substances in the sludge floc, an index such as the catalase activity which concerns the anti-oxidizing enzyme activity of the activated-sludge microorganisms, or the concentration of dissolved oxygen in the activated-sludge-mixed liquid in the aeration vessel and varying the amount of ozone injected, the circulated flow of sludge, the number of cycles, the cycle interval, and the amount of air supplied depending on these various measured values in the control section 12.

Embodiment 21

Figure 24:
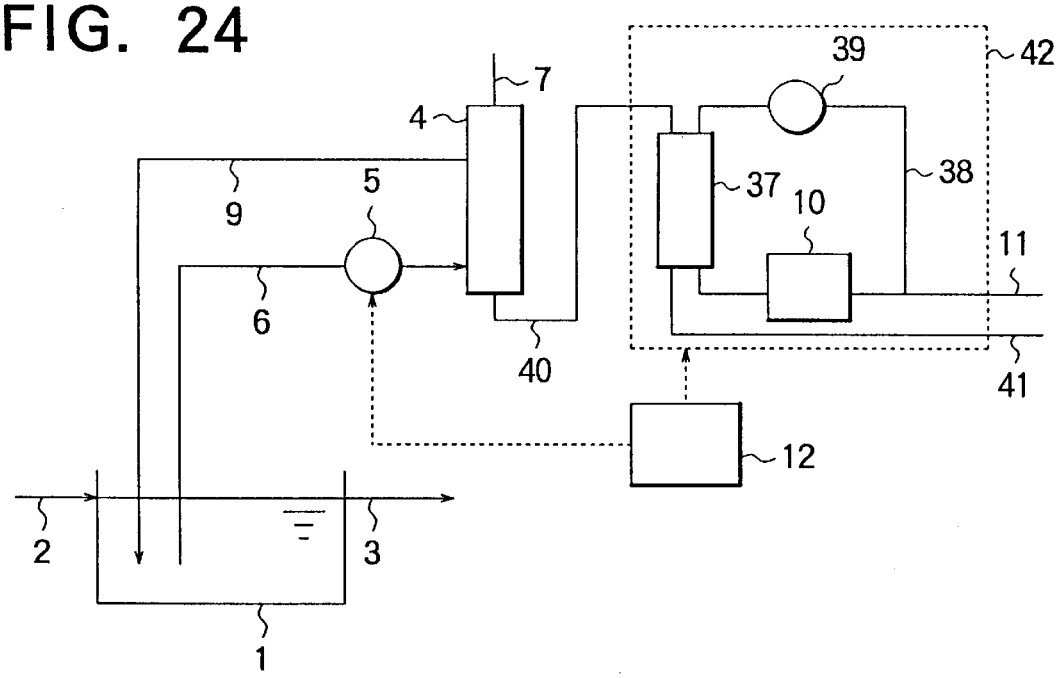
FIG. 24 is a flowchart describing the operation of a waste water treatment apparatus according to another embodiment of this invention.

Then, a waste water ozonization apparatus according to Embodiment 21 of this invention is described with reference to the drawings. FIG. 24 shows a flow for the waste water ozonization apparatus according to this invention. In this figure, 42 is an ozone generation section according to this embodiment. In this ozone generation section 42, 37 is an ozone adsorption tower filled with silica gel that adsorbs ozone generated by the ozonizer 10. Reference numeral 38 indicates a gas circulating channel including a gas circulating pump 39 in its middle and interconnected with the material gas supply channel 11. Reference numeral 40 designates an ozone injection passage that interconnects the ozone adsorption tower 37 with the ozonization vessel 4 and that injects ozone into ozonization vessel 4 from the ozone adsorption tower 37. Reference numeral 41 denotes a desorption gas supply channel that is interconnected with the ozone adsorption tower 37 and that feeds a gas such as an oxygen gas to the ozone adsorption tower 37 to desorb the ozone adsorbed into the silica gel. The other components are the same as in FIG. 10.

Next, the operation is described. During the intermittent ozonization of the activated sludge similar to that of Embodiment 7 and while ozonization is not executed, the ozonizer 10 continuously generates ozone and directs ozone to the ozone adsorption tower 37 in order to allow it to be adsorbed into the silica gel in the ozone adsorption tower. The gas discharged from the ozone adsorption tower 37 after adsorption is directed back to the ozonizer 10 using the gas circulating channel 38 and the gas circulating pump 39 so that it can be used as a material for ozone.

While the sludge is being ozonized, an oxygen gas or air is delivered to the material gas supply channel 11 in such a way that the pressure of the material gas in the ozonizer 10 is constant, and the ozonizer 10 generates and feeds ozone to the ozonization vessel 4 through the ozone injection channel 40. At the same time, a gas such as an oxygen gas is fed back to the ozone adsorption tower 37 through the desorption gas channel 41 to desorb the ozone adsorbed into the silica gel. The desorbed ozone is delivered to the ozonization vessel 4 via the ozone injection channel 40. The control section 12 sets the amount of ozone injected per cycle, the number of cycles per day, and the cycle interval that are required for the intermittent ozonization and that are also suited for reducing the amount of sludge generated and preventing the sludge from sedimenting inappropriately or recovering appropriate sedimentation. Depending on these settings, the control section 12 then controls the series of operations in the ozone generation section 42 including ozone generation, adsorption, desorption, and injection and operates the sludge drawing pump 5.

By allowing the ozone generation section 42 to perform the adsorption and desorption of ozone in addition to its generation as described above, ozone can be generated and temporarily stored even when the ozonization is not carried out so that a required ozone dose can be desorbed in order to ozonize sludge. This configuration increases the operation rate of the ozonizer 10 to allow ozone dose generated per unit time by the ozonizer, that is, its ozone generation capability to be substantially reduced. It also allows inexpensive power provided during midnight to be used to reduce running costs required to manufacture ozone. Thus, this is a very effective ozone generation method in intermittently injecting a required ozone dose when required.

In the above example, ozone can be more efficiently absorbed and desorbed by providing a refrigerator and a heater in the ozone adsorption tower to control the temperature during adsorption and desorption; that is, during adsorption, the temperature of the ozone adsorption tower 37 is lowered to facilitate the adsorption of ozone into the silica gel, whereas during desorption, the temperature is increased to facilitate the desorption of the ozone from the silica gel into the gas. In addition, the above embodiment uses gas purge for desorption, but the temperature of the silica gel may be increased to cause desorption.

In addition, although the above example uses the ozone adsorption tower 37 filled with the adsorbent to store the ozone generated, this embodiment is not limited to this aspect but similar effects can be obtained by using instead of the ozone adsorption tower 37 an ozone gas storage tank capable of holding a concentrated and pressurized ozone gas in order to store the ozone in the form of a gas.

Although the above example ozonizes the activated sludge in the aeration vessel consisting of a single vessel, this embodiment is not limited to this aspect but similar effects can be obtained when the activated sludge in an aeration vessel composed of multiple sub-vessels is ozonized. In this case, by separating the vessel from which sludge is drawn from the vessel to which ozonized sludge is returned, the possibility that the quality of treated water will be degraded can be further reduced.

Although the above example uses the device for adsorbing and desorbing ozone generated, more efficient and stable operations can be performed by combining this device with a device such as an ozone storage vessel which temporarily stores ozonized sludge, an ozone injector such as an ozone diffuser which injects ozone as bubbles, an ozone injector such as an ejector, a mixer such as a line mixer, a device for adding hydrogen peroxide, or a device for crushing an activated-sludge floc.

In addition, in the above example, more effective operations can be performed by measuring an index such as SV concerning the sedimentation of the activated sludge, an organic substances decomposition activity index such as the respiratory activity, an incoming organic load index such as the concentration of organic substances in the incoming waste water, an index such as the concentration of polysaccharide which relates to the extracellular organic substances in the sludge floc, an index such as the catalase activity which concerns the anti-oxidizing enzyme activity of the activated-sludge microorganisms, or the concentration of dissolved oxygen in the activated-sludge-mixed liquid in the aeration vessel and varying the amount of ozone injected, the circulated flow of sludge, the number of cycles, the cycle interval, and the amount of air supplied depending on these various measured values in the control section 12.

Embodiment 22

Figure 25:
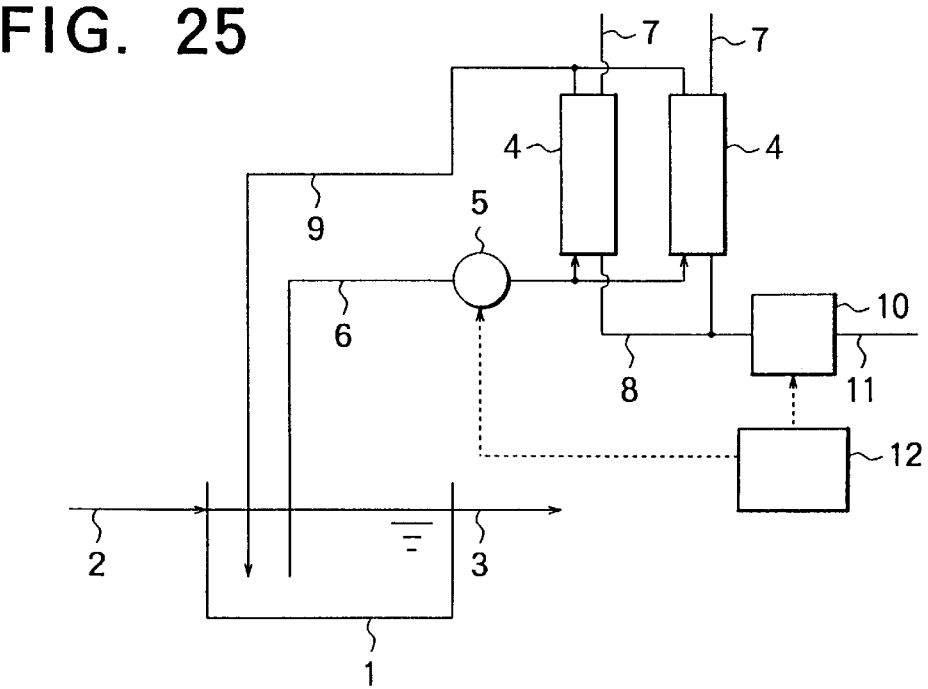
FIG. 25 is a flowchart describing the operation of a waste water treatment apparatus according to another embodiment of this invention.
Figure 26:
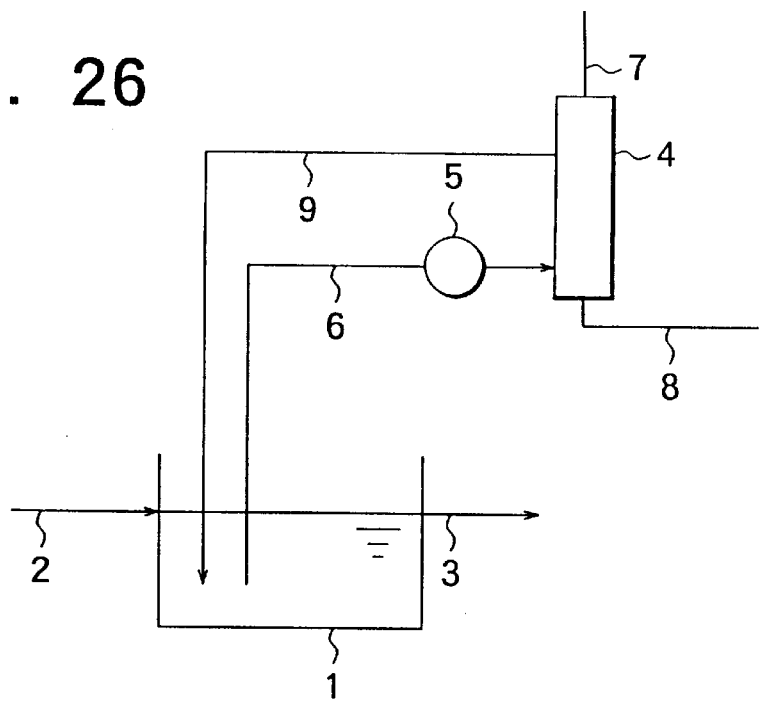
FIG. 26 is a flowchart describing the operation of a waste water treatment apparatus according to the prior art.
Figure 27:
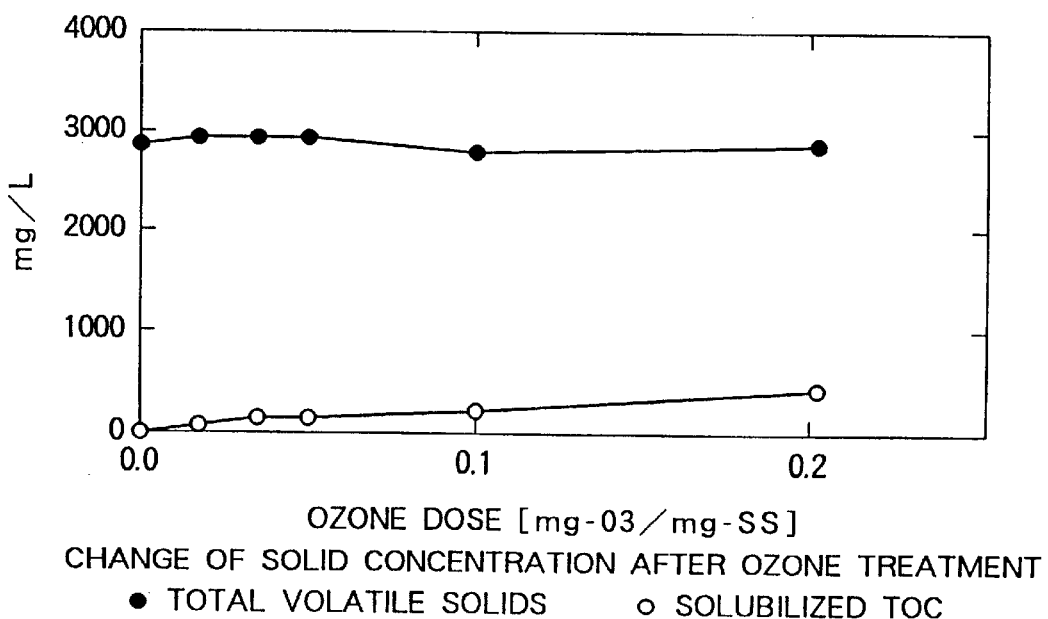
FIG. 27 is a characteristic diagram showing the relationships between ozone dose and the concentrations of MLVSS in sludge and soluble TOC.

Then, a waste water ozonization apparatus according to Embodiment 22 of this invention is described with reference to the drawings. FIG. 25 shows a flow for the waste water ozonization apparatus according to this invention. In this figure, two ozonization vessels 4 are located in parallel, and each vessel 4 is interconnected with the drawn-sludge channel 6 from the aeration vessel 1; the ozonized sludge channel 9 to the aeration vessel 1; the ozone supply channel 8 from the ozonizer 10; and the discharged-ozone channel 7 so that ozone can be alternately injected into each of the ozone reaction vessel 4. The other components are the same as in FIG. 10.

Next, the operation is described. During the waste water treatment in the aeration vessel 1, the control section 12 operates the sludge drawing pump 5 to return the sludge in the aeration vessel 1 to the aeration vessel 1 through the drawn-sludge channel 6, one of the ozonization vessels 4, and the ozonized-sludge channel 9 in order to circulate the sludge in the aeration vessel 1. Subsequently, intermittent ozonization similar to that in Embodiment 7 is executed.

During the next ozonization cycle, the other ozonization vessel 4 is used to carry out similar ozonization. Subsequently, the two ozonization vessels 4 are alternately used to ozonize the sludge. The control section 12 sets the amount of ozone injected per cycle, the number of cycles per day, and the cycle interval that are required for the intermittent ozonization and that are also suited for reducing the amount of sludge generated and preventing the sludge from sedimenting inappropriately or recovering appropriate sedimentation. The control section 12 then operates the sludge drawing pump 5 and the ozonizer 10, and changes over the ozonization vessels 4 depending on these settings.

By using the two ozonization vessels for the intermittent ozonization as described above, the ozonization vessels 4 can be miniaturized to increase the number of treatment cycles per day. Increasing the number of treatment cycles enables the amount of ozone injected per cycle to be reduced, thereby allowing the amount of ozone generated by the ozonizer 10 per unit time, that is, its ozone generation capability to be reduced.

Using the two ozonization vessels 4 enables sludge to be ozonized even if both the replacement of the sludge and the purging of dissolved ozone must be executed during a single cycle, thereby allowing the number of cycles to be increased. In addition, although the above example installs the two ozonization vessels 4, this embodiment is not limited to this aspect but more ozonization vessels 4 may be installed.

Although the above example ozonizes the activated sludge in the aeration vessel consisting of a single vessel, this embodiment is not limited to this aspect but similar effects can be obtained when the activated sludge in an aeration vessel composed of multiple sub-vessels is ozonized. In this case, by separating the vessel from which sludge is drawn from the vessel to which ozonized sludge is returned, the possibility that the quality of treated water will be degraded can be further reduced.

Although the above example uses the plurality of ozonization vessels, more efficient and stable operations can be performed by combining these ozonization vessels with a device such as an ozone storage vessel which temporarily stores ozonized sludge, an ozone injector such as an ozone diffuser which inject ozone as bubbles, an ozone injector such as an ejector, a mixer such as a line mixer, a device for adding hydrogen peroxide, a device for crushing an activated-sludge floc or a device for adsorbing and desorbing ozone generated.

In addition, in the above example, more effective operations can be performed by measuring an index such as SV concerning the sedimentation of the activated sludge, an organic substance decomposition activity index such as the respiratory activity, an incoming organic load index such as the concentration of organisms in the incoming waste water, an index such as the concentration of polysaccharide which relates to the extracellular organic substances in the sludge floc, an index such as the catalase activity which concerns the anti-oxidizing enzyme activity of the activated-sludge microorganisms, or the concentration of dissolved oxygen in the activated-sludge-mixed liquid in the aeration vessel and varying the amount of ozone injected, the circulated flow of sludge, the number of cycles, the cycle interval, and the amount of air supplied depending on these various measured values in the control section 12.

Although embodiments 1 to 22 uses as a microorganism-mixed liquid for ozonization the activated sludge in the aeration vessel used in the activated-sludge process for continuously treating waste water, this invention is not limited to this aspect, but similar effects can be provided for a microorganism-mixed liquid in the waste water treatment process using microorganisms such as the returned sludge in the activated-sludge process or the activated sludge in a precipitation vessel in the same process, or the activated sludge in the aeration vessel in the batch activated-sludge process and/or the contact oxidization process.

What is claimed is:

1. A waste water ozonization process comprising:

drawing part of a liquid mixture including microorganisms from a treatment system;

intermittently injecting a gas mixture including ozone in a concentration of at least 50 mg/L into the liquid mixture drawn from the treatment system; and returning the liquid mixture into which ozone has been injected to the treatment system.

2. The waste water ozonization process according to claim 1, wherein the liquid mixture is subjected to injection of ozone for a time of several seconds to 10 minutes.

3. A waste water ozonization process including:

drawing part of a liquid mixture including microorganisms from a treatment system;

injecting a gas mixture including ozone in a concentration of at least 50 mg/L into the liquid mixture drawn from the treatment system; and returning the liquid mixture into which ozone has been injected to the treatment system.

4. A waste water ozonization process comprising:

part of a liquid mixture including microorganisms from a treatment system;

injecting ozone into the liquid mixture drawn from the treatment system;

changing ozone injecting conditions depending on threshold SVI value a microorganism aggregate in the liquid mixture; and returning the liquid mixture into which ozone has been injected to the treatment system wherein the ozone injected is at least 10 mg-$O_3$/g MLSS for a liquid mixture including microorganisms and having a sedimentation rate not more than the threshold SVI value, and at least 1 mg-$O_3$/g-MLSS for a liquid mixture including microorganisms and having a sedimentation rate higher than the SVI value.

5. A waste water ozonization process comprising:

part of a liquid mixture including microorganisms from a treatment system;

injecting ozone into the liquid mixture drawn from the treatment system;

changing ozone injecting conditions depending on threshold SVI value a microorganism aggregate in the liquid mixture; and returning the liquid mixture into which ozone has been injected to the treatment system wherein the amount of microorganisms is 0.5 to 5 times as large as the amount of microorganisms that are multiplied by organic substances in waste water for a liquid including microorganisms and having a sedimentation rate no larger than the threshold SVI value, and the amount of microorganisms is 2 to 10 times as large as the amount of sludge that is multiplied by organic substances in waste water for a liquid including microorganisms and having a sedimentation rate higher than the threshold SVI value.

6. A waste water ozonization apparatus comprising:

a plurality of microorganism reaction vessels in a treatment system;

drawing means connected to a first one of said microorganism reaction vessels for drawing a liquid mixture including microorganisms from the treatment system;

ozone generation means for generating ozone for reaction with the liquid mixture drawn from the treatment system;

an ozonization vessel receiving the liquid mixture drawn from the treatment system and into which a quantity of the ozone generated by said ozone generation means is supplied; and returning means connected to a second one of said microorganism reaction vessels, which is separated from said first one of said vessels, for returning the liquid mixture drawn from the treatment system, after ozonization, to the treatment system.

7. The waste water ozonization apparatus according to claim 6, wherein ozone generated by said ozone generation means in a concentration of at least 50 mg/L is injected into the liquid mixture drawn from the treatment system.

8. A waste water ozonization apparatus comprising:

drawing means for drawing a liquid mixture including microorganisms from a treatment system;

ozone generation means for generating ozone for reaction with the liquid mixture drawn from the treatment system, an ozonization vessel receiving the liquid mixture drawn from the treatment system and into which a quantity of the ozone generated by said ozone generation means is supplied;

returning means for returning the liquid drawn from the treatment system, after ozonization, to the treatment system; and measuring means for making a measurement of a characteristic of the liquid mixture drawn from the treatment system to determine control conditions.

9. The waste water ozonization apparatus according to claim 8, wherein ozone is intermittently injected into the liquid mixture drawn from the treatment system.

10. The waste water ozonization apparatus according to claim 8 wherein said measuring means measures sedimentation rate of a microorganism aggregate in the liquid mixture drawn from the treatment system, and the quantity of ozone supplied to the mixture in the ozonization vessel depends on the sedimentation rate measured.

11. The waste water ozonization apparatus according to claim 8 wherein said measuring means measures organism decomposition activity of a microorganism in the liquid mixture drawn from the treatment system, and the quantity of ozone supplied to the mixture in the ozonization vessel depends on the organic load measured.

12. The waste water ozonization apparatus according to claim 8 wherein said measuring means measures organic load of waste water that flows into the treatment system, and the quantity of ozone supplied to the mixture in the ozonization vessel depends on the organic load measured.

13. The waste water ozonization apparatus according to claim 8, wherein said measuring means measures dissolved oxygen concentration in the liquid mixture drawn from the treatment system, and the quantity of ozone supplied to the mixture in the ozonization vessel depends on the organic load measured.

14. The waste water ozonization apparatus according to claim 8 wherein said measuring means makes measurements relating to extracellular organic substances in a microorganism aggregate in the liquid mixture drawn from the treatment system, and the quantity of ozone supplied to the mixture in the ozonization vessel depends on a measurement made by said measuring means.

15. The waste water ozonization apparatus according to claim 8 wherein said measuring means measures anti-oxidation enzyme activity of a microorganism in the liquid mixture drawn from the treatment system, and the quantity of ozone supplied to the mixture in the ozonization vessel depends on the anti-oxidation enzyme activity measured.

16. The waste water ozonization apparatus according to claim 8 including storage means for storing the liquid mixture drawn from the treatment system after ozonization.

17. The waste water ozonization apparatus according to claim 8, wherein a reagent is injected into the liquid mixture drawn from the treatment system.

18. The waste water ozonization apparatus according to claim 8 wherein said ozonization vessel includes distributing means for distributing a microorganism aggregate in the liquid mixture drawn by said drawing means.

19. The waste water ozonization apparatus according to claim 8 including storage means for storing the ozone generated by said ozone generation means.

20. The waste water ozonization apparatus according to claim 8, wherein ozone generated by said ozone generation means in a concentration of at least 50 mg/L is injected into the liquid mixture drawn from the treatment system.

21. The waste water ozonization apparatus according to claim 8, wherein ozone generated by said ozone generation means is injected into the liquid mixture drawn by said drawing means, and said apparatus comprises mixing means for mixing the ozone with the mixture drawn from the treatment system to produce an ozone mixture and for guiding the ozone mixture to said returning means.

* * * * *